(12) United States Patent
Matson et al.

(10) Patent No.: US 12,091,484 B2
(45) Date of Patent: Sep. 17, 2024

(54) COPOLYMER COMPATIBILIZERS AND USES THEREOF

(71) Applicant: VIRGINIA TECH INTELLECTUAL PROPERTIES, INC., Blacksburg, VA (US)

(72) Inventors: John Matson, Blacksburg, VA (US); Kyle Arrington, Blacksburg, VA (US); Kevin Edgar, Blacksburg, VA (US); Junyi Chen, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 983 days.

(21) Appl. No.: 16/982,536

(22) PCT Filed: Mar. 18, 2019

(86) PCT No.: PCT/US2019/022760
§ 371 (c)(1),
(2) Date: Sep. 18, 2020

(87) PCT Pub. No.: WO2019/182978
PCT Pub. Date: Sep. 26, 2019

(65) Prior Publication Data
US 2021/0002406 A1 Jan. 7, 2021

Related U.S. Application Data

(60) Provisional application No. 62/672,612, filed on May 17, 2018, provisional application No. 62/644,863, filed on Mar. 19, 2018.

(51) Int. Cl.
C08F 293/00 (2006.01)
C08F 290/10 (2006.01)
C08L 65/00 (2006.01)

(52) U.S. Cl.
CPC .......... *C08F 293/00* (2013.01); *C08F 290/10* (2013.01); *C08L 65/00* (2013.01)

(58) Field of Classification Search
CPC ....... C08F 298/00; C08F 298/10; C08L 65/00
See application file for complete search history.

(56) References Cited

U.S. PATENT DOCUMENTS

| | | | |
|---|---|---|---|
| 3,670,045 A | 6/1972 | Koleske et al. | |
| 4,555,546 A | 11/1985 | Patel | |
| 4,906,687 A | 3/1990 | Modic | |

(Continued)

OTHER PUBLICATIONS

International Search Report and Written Opinion issued by the U.S. Patent Office, as International Searching Authority on May 14, 2019 for PCT/US2019/022760.

(Continued)

*Primary Examiner* — Ling Siu Choi
*Assistant Examiner* — Andrea Wu
(74) *Attorney, Agent, or Firm* — Carin R. Miller, Esq.; Johnson, Marcou, Isaacs & Nix, LLC

(57) ABSTRACT

Described herein are block copolymers that can be used as compatibilizers. The block copolymers can be graft block or triblock copolymers. The block copolymers can include a polysaccharide or a polyester and a polyolefin. Also described herein are polymer blends that can include and be made using the block copolymers described herein.

20 Claims, 21 Drawing Sheets

(56) References Cited

U.S. PATENT DOCUMENTS

| | | | |
|---|---|---|---|
| 2007/0224244 A1* | 9/2007 | Weber | A61L 27/047 424/426 |
| 2009/0072424 A1 | 3/2009 | Herve et al. | |
| 2010/0075871 A1 | 3/2010 | Engelhardt et al. | |
| 2011/0229510 A1 | 9/2011 | Danishefsky et al. | |
| 2013/0131221 A1* | 5/2013 | Basu | C08L 29/04 524/37 |
| 2013/0189609 A1* | 7/2013 | Aissou | C09D 105/00 521/77 |
| 2014/0221552 A1 | 8/2014 | Peters | |

OTHER PUBLICATIONS

Narumi et al., "Glycoconjugated Polymer: Synthesis and Characterization of Poly(vinyl saccharide)-block-Polystyrene-block-Poly(vinyl saccharide) as an Amphiphilic ABA Triblock Copolymer", Journal of Polymer Science: Part A: Polymer Chemistry, vol. 44, Issue 13, pp. 3978-3985, First published: May 12, 2006.

Arrington, K.J., et al., "Photo- and Biodegradable Thermoplastic Elastomers: Combining Ketone-Containing Polybutadiene with Polylactide Using Ring-Opening Polymerization and Ring-Opening Metathesis Polymerization", Macromolecules, ACS Publications, pp. 4180-4187, Published: May 17, 2017.

Averous, L, et al., "Plasticized starch±cellulose interactions in polysaccharide composites", Plolymer, vol. 42, pp. 6565-6572, Accepted: Feb. 6, 2001.

Cressey, Daniel, "The Plastic Ocean", Nature, vol. 536, No. 7616, pp. 263-265, Aug. 18, 2016.

Dave, V., et al., "Hyaluronic Acid-(Hydroxypropyl)cellulose Blends: A Solution and Solid State Study", Macromolecules, vol. 28, No. 10, pp. 3531-3539, Apr. 1, 1995.

De Oliveira, W., et al., "Novel cellulose derivatives. II. synthesis and characteristics of mono-functional cellulose propionate segments*", Cellulose 1994, vol. 1, No. 1, pp. 77-86, 1993.

Di Lorenzo, M.L., et al., "Compatibilization criteria and procedures for binary blends: A Review", Journal of Polymer Engineering, vol. 17, No. 6, pp. 429-460, 1997.

Edgar, K. J., et al., "Advances in cellulose ester performance and application", Progress in Polymer Science, vol. 26, No. 9, pp. 1605-1688, Accepted: Jul. 5, 2001.

Fox, S. C., et al., "Regioselective Esterification and Etherification of Cellulose: A Review", Biomacromolecules, vol. 12, No. 6, pp. 1956-1972, Published: Apr. 27, 2011.

Geyer, R., et al., "Production, use, and fate of all plastics ever made", Science Advances, vol. 3, No. 7, pp. 1-5, e1700782, Jul. 19, 2017.

Glasser, W. G., "6. Prospects for Future Applications of Cellulose Acetate", Macromolecular Symposia, Wiley Online Library, vol. 208, pp. 371-394, 2004.

Hobbs, S.Y., "The effect of rubber particle size on the impact properties of high impact polystyrene (HIPS) blends", Polymer Engineering & Science, vol. 26, No. 1, pp. 74-81, Jan. 1986.

Hong, P., et al., "Surface Segregation in Blends of Polystyrene and Deuterated Polystyrene" Macromolecules, vol. 26, No. 6, pp. 1460-1464.

Ji, S., et al., "Controlled Synthesis of High Molecular Weight Telechelic Polybutadienes by Ring-Opening Metathesis Polymerization", Macromolecules, vol. 37, No. 15, pp. 5485-5489, Published on Web: Jul. 2, 2004.

Kamitakahara, H., et al., "A versatile pathway to end-functionalized cellulose ethers for click chemistry applications", Carbohydrate Polymers, vol. 151, pp. 88-95, Available online: May 16, 2016.

Kamitakahara, H., et al., "Synthesis of diblock copolymers with cellulose derivatives. 2. Characterization and thermal properties of cellulose triacetate-block-oligoamide-15", Cellulose, vol. 12, No. 5, pp. 527-541, Accepted in revised form: May 10, 2005.

Khalf, A., et al., "Effect of grafting cellulose acetate and methylmethacrylate as compatibilizer onto NBR/SBR blends", Materials & Design, vol. 31, No. 5, pp. 2592-2598, Available online: Nov. 16, 2009.

Kim, M., et al., "Evaluation of degradability of hydroxypropylated potato starch/polyethylene blend films", Carbohydrate Polymers, vol. 54, No. 2, pp. 173-181, Accepted: May 8, 2003.

Klemm, D., et al., "Cellulose: Fascinating Biopolymer and Sustainable Raw Material", Angewandte Chemie International Edition, vol. 44, No. 22, pp. 3358-3393, 2005.

Koning, C., et al., "Strategies for Compatibilization of Polymer Blends", Prog. Polym. Sci., vol. 23, No. 4, pp. 707-757, 1998.

Lebreton, L., et al., "Evidence that the Great Pacific Garbage Patch is rapidly accumulating plastic", Sci. Rep., vol. 8, No. 1, No. 4666, Published online: Mar. 22, 2018.

Lebreton, L., et al., "River plastic emissions to the world's oceans", Nat Commun., vol. 8, No. 15611, pp. 1-10, Published: Jun. 7, 2017.

Lomakin, S., et al., "Thermal degradation of biodegradable blends of polyethylene with cellulose and ethylcellulose", Thermochimica Acta, vol. 521, Issue (1-2), pp. 66-73, Published online: Apr. 16, 2011.

Odian, George, "Principles of Polymerization", Wiley-Interscience New York, Fourth Edition, pp. 1-839, 2004.

Park, H.-M., et al., "Green" Nanocomposites from Cellulose Acetate Bioplastic and Clay: Effect of Eco-Friendly Triethyl Citrate Plasticizer, Biomacromolecules, vol. 5, No. 6, pp. 2281-2288.

Schatz, C., et al., "Polysaccharide-Containing Block Copolymers: Synthesis, Properties and Applications of an Emerging Family of Glycoconjugates", Macromol. Rapid Commun., vol. 31, No. 19, pp. 1664-1684, 2010.

Schneiderman, D. K., et al., "50th Anniversary Perspective: There Is a Great Future in Sustainable Polymers", Macromolecules, vol. 50, No. 10, pp. 3733-3749, 2017.

Silberberg, J., et al., "The Effect of Rubber Particle Size on the Mechanical Properties of High-Impact Polystyrene", Journal of Applied Polymer Science, vol. 22, No. 3, pp. 599-609, 1978.

Wu, Y.-B., et al., "Preparation and characterization on mechanical and antibacterial properties of chitsoan/cellulose blends", Carbohydrate Polymers, vol. 57, No. 4, pp. 435-440, Available online: Jul. 2, 2004.

Yamaguchi, M., et al., "Material design of retardation films with extraordinary wavelength dispersion of orientation birefringence: a review", Cellulose, vol. 19, No. 3, pp. 601-613, Published online: Feb. 4, 2012.

Miura et al., "Glycopolymer Nanobiotechnology", Chem. Rev. 2016. 116:1673-1692.

USPTO Definition of C08B Polysaccharides; derivatives thereof, 10 pages.

* cited by examiner strained cyclic olefin → ROMP polymer

COPOLYMER COMPATIBILIZERS AND USES THEREOF

CROSS-REFERENCE TO RELATED APPLICATIONS

This application claims the benefit of and priority to U.S. Provisional Patent Application No. 62/64,863, filed on Mar. 19, 2018, entitled "Multiblock Copolymers of Polysaccharides and Synthetic Polymers and Their Use in Compatibilizing Polymer Blends," the contents of which is incorporated by reference herein in its entirety.

This application also claims the benefit of and priority to U.S. Provisional Patent Application No. 62/672,612, filed on May 17, 2018, entitled "Synthesis of Polysaccharide Graft-Copolymers," the contents of which is incorporated by reference herein in its entirety.

STATEMENT REGARDING FEDERALLY SPONSORED RESEARCH

This invention was made with government support under Grant No. DMR1308276 awarded by the National Science Foundation. The government has certain rights in the invention.

BACKGROUND

Plastics are a ubiquitous part of everyday life. Despite the convenience plastic affords, it is typically not biodegradable. As such, plastic waste is a growing environmental problem, particularly in the ocean. Therefore, there exists a need for materials, methods, and/or techniques to reduce plastic waste.

SUMMARY

Described herein are aspects of an ABA triblock copolymer that can include a polysaccharide, wherein the polysaccharide is the A block polymer; and a polyolefin, wherein the polyolefin is the B block polymer. The B block polymer can be a polybutadiene. The polysaccharide can be cellulose or a cellulose derivative. The polysaccharide can be cellulose triacetate. The polysaccharide can be methyl cellulose. The B block polymer is a polybutadiene and the polysaccharide can be cellulose triacetate or methyl cellulose.

Described herein are aspects of a graft block copolymer that can have the structure A-g-B, that can include a polyolefin, wherein the polyolefin can be the A-block polymer; and a polysaccharide, wherein the polysaccharide can be the B block polymer. The polysaccharide can be cellulose triacetate. The polyolefin can be polybutadiene.

Described herein are aspects of a polymer blend that can include a compatibilizer, wherein the compatibilizer is an ABA triblock copolymer as described herein. The compatibilizer can be included at a wt. % ranging from about 0.5 wt. % to about 10 wt. %. The compatibilizer can be present at a wt. % ranging from about 0.5 wt. % to about 5 wt. %. The compatibilizer can be present at a wt. % ranging from about 0.5 wt. % to about 2.5 wt. %. The compatibilizer can be present at a wt. % ranging from about 0.5 wt. % to about 1 wt. %.

Described herein are aspects of a polymer blend that can include a compatibilizer, where the compatilizer can be a graft block copolymer as described herein. The compatibilizer can be included at a wt. % ranging from about 0.5 wt. % to about 10 wt. %. The compatibilizer can be present at a wt. % ranging from about 0.5 wt. % to about 5 wt. %. The compatibilizer can be present at a wt. % ranging from about 0.5 wt. % to about 2.5 wt. %. The compatibilizer can be present at a wt. % ranging from about 0.5 wt. % to about 1 wt. %.

Described herein are aspects of making a polymer blend that can include the step of compatibilizing a polysaccharide and a polyolefin with an ABA triblock copolymer as described elsewhere herein.

Described herein are aspects of making a polymer blend that can include the step of compatibilizing a polysaccharide and a polyolefin with a graft block copolymer as described elsewhere herein.

Described herein is a compound according to formula 3,

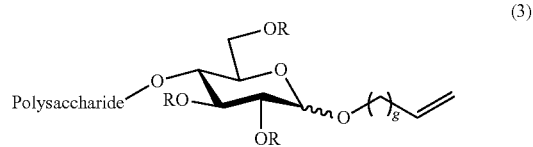

(3)

wherein g ranges from, 3-9.

Described herein is a compound according to formula 31,

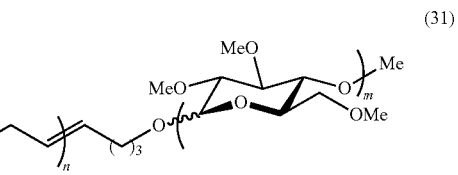

(31)

wherein m ranges from 10-500 and n ranges from 10-500.

Described herein is a compound according to formula 32,

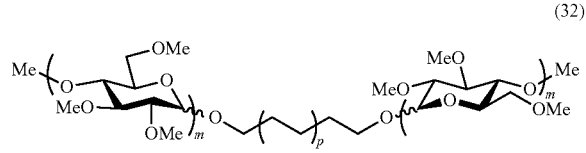

(32)

wherein m ranges from 10-500, wherein p ranges from 20-1000.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 20A Blend 90:10-0. FIG. 20B Blend 90:10-5. FIG. 20C Blend 80:20-0 FIG. 20D Blend 80:20-5. Dark circles show PB domains in a matrix of lighter CTA. Scale bars 50 μm.

(FIG. 33A) 90:10 Hi-C series. 90:10-0; 90:10-1; 90:10-2.5; 90:10-5. (FIG. 33B) 80:20 Hi-C series. 80:20-0; 80:20-1; 80:20-2.5; 80:20-5.

DETAILED DESCRIPTION

Figure 1:
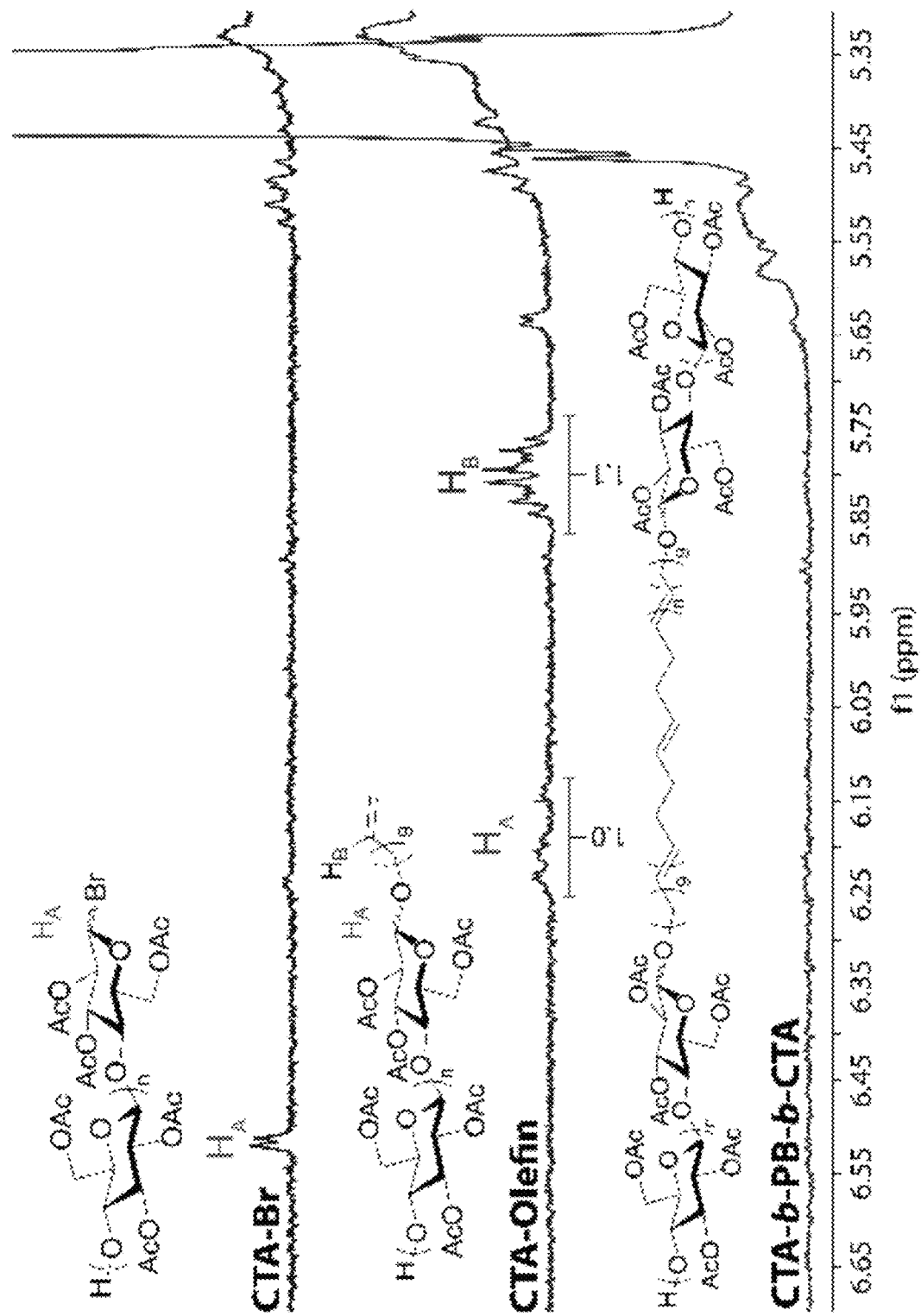
FIG. 1 shows $^1$H NMR spectra of brominated CTA (top spectrum), alkene-functionalized CTA (middle spectrum), and CTA-b-PB-b-CTA ABA triblock copolymer (bottom spectrum). Highlighted are chemical shift changes of the anomeric protons and the appearance and disappearance of a vinylic proton before and after ROMP.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that stated range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used in the specification and the appended claims, the singular forms "a," "an," and "the" include plural referents unless the context clearly dictates otherwise.

As used herein, "about," "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Embodiments of the present disclosure will employ, unless otherwise indicated, techniques of chemistry, organic chemistry, polymer chemistry, and the like, which are within the skill of the art. Such techniques are explained fully in the literature.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible unless the context clearly dictates otherwise.

Definitions

As used herein, "additive" in the context of polymer formulations refers to a substance added to a polymer.

As used herein, "adhesion" can refer to holding together of two bodies by interfacial forces or mechanical interlocking on a micrometer or less scale.

As used herein, "compatibility" refers to the capability of the individual component substances in either an immiscible polymer blend or a polymer composite to exhibit interfacial adhesion.

As used herein, "compatibilization" is the process of modification of the interfacial properties in an immiscible polymer blend that results in formation of the interphases and stabilization of the morphology, leading to the creation of an improved polymer blend or alloy.

As used herein, "compatibilizer" refers to a polymer or copolymer that, when added to an immiscible polymer blend, can modify its interfacial character and stabilize its morphology.

As used herein, "compatible polymer blend" can refer to an immiscible polymer blend that exhibits macroscopically substantially uniform physical properties throughout its whole volume.

As used herein, cellulose derivative can refer to substituted cellulose including but not limited to cellulose esters (e.g. cellulose acetate (CA), cellulose triacetate (CTA), cellulose acetate propionate (CAP), cellulose acetate butyrate (CAB)), ethyl cellulose, methyl cellulose, hydroxyethyl cellulose, hydroxylpropyl cellulose, carboxymethyl cellulose, and nitrocellulose.

As used herein, "hard segment" refers to the phase domain of microscopic or smaller size, usually in a block, graft, or segmented copolymer, composed essentially of those segments of the polymer that are rigid and capable of forming strong intermolecular interactions.

As used herein, "immiscibility" refers to the inability of a mixture to form a single phase.

As used herein, "immiscible-polymer blend" refers to a polymer blend that exhibits immiscibility.

As used herein, "interfacial adhesion" refers to Adhesion in which interfaces between phases or components are maintained by intermolecular forces, chain entanglements, or both, across the interfaces.

As used herein, "interfacial region" refers to the region between phase domains in an immiscible polymer blend in which a gradient in composition exists.

As used herein, "multiphase copolymer" refers to a copolymer comprising phase-separated domains.

As used herein, "polymer alloy" refers to a polymeric material, exhibiting macroscopically uniform physical properties throughout its whole volume that is composed of a compatible polymer blend, a miscible polymer blend, or a multiphase copolymer.

As used herein, "polymer blend" refers to a macroscopically substantially homogeneous mixture of two or more different species of polymer.

As used herein, "polysaccharide" refers to polymeric carbohydrate molecules that are composed of chains, typically long chains, of monosaccharide units bond together by glycosidic linkages, that upon hydrolysis, yield the constituent monosaccharides or oligosaccharides.

As used herein "soft segment" can refers to the phase domain of microscopic or smaller size, usually in a block, graft, or segmented copolymer, composed essentially of those segments of the polymer that have glass transition temperatures lower than the temperature of use.

As used herein, "thermoplastic elastomer" refers to melt-processable polymer blend or copolymer in which a continuous elastomeric phase domain is reinforced by dispersed hard (glassy or crystalline) phase domains that act as junction points over a limited range of temperature.

Discussion

Plastic waste is a growing environmental problem, particularly in the ocean, which has led to the call for new polymeric materials with increased sustainability. Biodegradable polysaccharides could provide solutions to this problem. A key example is cellulose, a highly abundant polymeric material with an estimated annual biomass production of $1.5 \times 10^{12}$ tons. Compared to the annual global production of plastics at $2.8 \times 10^8$ tons in 2015, cellulose is a virtually inexhaustible, renewable source of polymeric materials. Due to this abundance, cellulose and its derivatives have found many applications commercially, with billions of kilograms sold per year.[7] However, applications for cellulose and other polysaccharides are limited due to issues including inherent brittleness and poor processability. To broaden the scope of polysaccharide applications, researchers have functionalized, plasticized, and blended polysaccharides to make new materials with improved thermomechanical properties. Despite this progress, new methods are needed to improve the toughness of polysaccharides, enhance their application scope, and create alternatives that support the vision of a more sustainable planet.

Enhancing polymer toughness can be accomplished efficiently and economically through blending. However, blending polymers without any additives usually results in phase separation between the polymers when mixed. These phase-separated domains typically provide properties inferior to those of the parent polymers, due to lack of adhesion between domains. To combat the lack of adhesion between polymer phases, compatibilization with copolymer additives can enhance interfacial cohesion and dramatically improve mechanical properties in polymer blends. For example, high impact polystyrene (HIPS) is a commercial polymer blend of polystyrene (PS) and polybutadiene (PB) compatibilized by a small amount of a PS-graft-PB copolymer.[20] In general, efficient polymer blending can be achieved with 1-5 wt. % of a compatibilizing graft or block(y) copolymer for improved thermomechanical blend properties.

Blending PB with cellulose-derived polymers could provide a new method for toughening polysaccharides. This could further broaden their application scope, providing a sustainable alternative to traditional plastics by simple blending combined with the addition of 1-5 wt % of a copolymer compatibilizer. However, to date no blends of PB and cellulose or cellulose derivatives have been reported, likely due to a lack of effective compatibilizers.

Cellulose triacetate (CTA) is one of the most common cellulose derivatives, originally gaining market popularity as a safe alternative to nitrocellulose film. It is now used widely as a protective film for the polarizer film layer in liquid crystalline display (LCD) screens. However, applications of CTA, as for many cellulose derivatives, are limited by a lack of toughness. Polylactic acid (PLA) is a thermoplastic aliphatic polyester that is biodegradable and thus is being incorporated at an increasing rate into plastic-based products. PLA can be blended with various other polymers to alter or improve various PLA characteristics or to provide biodegradability to a resulting blend. However PLA still suffers from limitations inherent to the polymer when incorporated into useful blends such as TPE blends as noted above with respect to cellulose-derived polymers. As such, there exists a need for materials, such as compatibilizers, and methods of forming polysaccharide-based and polyester-based blends that can provide more sustainable thermoplastic polymer materials.

With that said, described herein are ABA triblock and graft block copolymers that can be used as compatibilizers to generate various polysaccharide-based and poly-ester based TPE blends. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Compatibilizers

Multiphase polymer blends are widely used. However, most pairs of polymers are immiscible with each other and thus can result in blends with poor mechanical properties and performance. Further, they can have less compatibility than would be required to obtain the desired level of properties and performance from their blends. Compatibilization is an interfacial phenomenon in which the blend properties can be enhanced while increasing adhesion between the phases of the blend, reducing the interfacial tension, and stabilizing morphology. Compatibilization can be achieved multiple ways. One of those is through the addition of compatibilizers. Described herein are aspects of triblock copolymer and graft block copolymer compatibilizers that can be used to compatibilize polysaccharide/polyolefin and/or polyester/polyolefin blends.

Block Copolymer Compatibilizers

Generally, block copolymers are a class of copolymers that are composed of "hard" (or "A" segments) and "soft" segments (or "B" segments). Triblock copolymers can be in the form of ABA or BAB. The triblock copolymers described herein follow the ABA form. The triblock copolymers described herein can be used as materials themselves to form new materials or can be used as compatibilizers that can be capable of improving one or more properties of a blend. Diblock compatibilizers described herein can follow the AB or BA form.

In some aspects, the A block of the ABA triblock copolymer compatibilizer can be a polysaccharide, a polyester, or a biodegradable polyester. Suitable polysaccharides include but are not restricted to cellulose and cellulose derivatives. In some aspects, the polysaccharide can be methyl cellulose, ethyl cellulose, or other cellulose ethers. In some aspects, the polysaccharide can be cellulose triacetate, cellulose acetate, cellulose acetate butyrate, cellulose acetate propionate, and other cellulose esters. Other suitable polysaccharides would include but not be limited to starch and its components (amylose and amylopectin), alginic acid, chitin, chitosan, pullulan, and curdlan.

In some aspects, the B block of the ABA triblock copolymer compatibilizer can be polybutadiene (PB) or a modified polybutadiene or a high density polyethylene (HDPE). In some aspects, the polybutadiene can be modified with a photodegradable polyketone. In some aspects the photodegradable polyketone can be poly(cyclooctene ketone) or other cyclic ketone-containing olefins.

The triblock copolymer compatibilizer can have the formula of polysaccharide-b-polyolefin-b-polysaccharide. The compatibilizer can also be a diblock copolymer with the formula of polysaccharide-b-PB or modified PB-b-polysaccharide, as well as polysaccharide-b-HDPE or HDPE-b-polysaccharide. The triblock copolymer compatibilizer can have the formula of polysaccharide-b-polyethylene-b-polysaccharide. The triblock copolymer compatibilizer can have the formula of polysaccharide-b-HDPE-b-polysaccharide. In some aspects the triblock copolymer compatibilizer can be CTA-b-PB-b-CTA. In some aspects, the triblock copolymer compatibilizer can be MC-b-HDPE-b-MC. The diblock copolymer compatibilizer can have the formula of polyester-b-PB or modified PB-b-polyester. The triblock copolymer compatibilizer can have the formula of PLA-b-PB-b-PLA or modified PB-b-PLA. Other triblock copolymer compatibilizers Other suitable block compatibilizers can include, but are not limited to, MC-b-HDPE-b-MC, MC-b-PB-b-MC, CAB-b-HDPE-b-CAB (CAB=cellulose acetate butyrate), CAB-b-PB-b-CAB, CAP-b-HDPE-b-CAP (CA=cellulose acetate propionate), and/or CAP-b-PB-b-CAP.

Graft Block Copolymers

Generally, graft copolymers are a class of copolymers in which one or more blocks of a homopolymer are grafted as branches onto a main chain. This makes it a branched copolymer with one or more side chains of a homopolymer attached to the backbone of the main chain. The graft copolymers described herein can be used as materials themselves to form new materials or can be used as compatibilizers that can be capable of improving one or more properties of a blend. In the context of the graft block copolymers described herein the A block can refer to those that form the main linear chain and the B block can refer to those that form the branched chains. In some aspects, the A blocks can be a polyolefin.

In aspects, the B block can be a polysaccharide. Suitable polysaccharides include, but are not limited to, substituted cellulose including but not limited to cellulose esters (e.g. cellulose acetate (CAc), cellulose triacetate (CTA), cellulose acetate-propionate (CAP), cellulose acetate-butyrate (CAB)), ethylcellulose, methylcellulose, hydroxyethylcellulose, hydroxylpropylcellulose, carboxymethylcellulose, and/or nitrocellulose. The graft block copolymer compatibilizer can be generated by monofunctionalizing a polysaccharide according to Scheme 4 discussed in detail in the Example section, followed by cyclic olefin addition to the reducing-end of the polysaccharide according to Scheme 5 discussed in detail in the Example section, followed by ROMP as shown in Scheme 6 discussed in detail in the Example section to generate the graft block copolymer compatibilizer.

Blends and Other Uses of the Triblock and Graft Block Copolymers

Also described herein are blends that can be made using the triblock copolymer compatibilizers or graft block compatibilizers described herein. The blends can have improved stability, mechanical properties, and/or other characteristics and/or performance as compared to blends made with the same components but without the compatibilizer.

In some aspects, the blends can be copolymer blends formed with an ABA triblock copolymer compatibilizer described herein. In some aspects, the blend can be synthesized by reacting an amount of an A block polymer, and amount of B block polymer, and an amount of an ABA triblock copolymer compatibilizer described herein. In some aspects the ratio of A:B can be about 1:1, 1:1.5, 1:2, 1:2.5, 1:3, 1:3.5, 1:4, 1:4.5, 1:5, 5:1, 4.5:1, 4:1, 3.5:1, 3:1, 2.5:1, 2:1, or 1:5. In some aspects, the ratio of A:B in A:B:Compatibilizer (C) can be about 1:1, 1.5:1, 2:1, 2.5:1, 3:1, 3.5:1, 4:1, 4.5:1, 5:1, 5.5:1, 6:1, 6.5:1, 7:1, 7.5:1, 8:1, 8.5:1, to 9:1. In some aspects, the ratio of A:C in A:B:C can be about 1:0.1-0.25, 1.5:0.1-0.25, 2:0.10.1-0.25, 2.5:0.10.1-0.25, 3:0.10.1-0.25, 3.5:0.10.1-0.25, 4:0.10.1-0.25, 4.5:0.10.1-0.25, 5:0.10.1-0.25, 5.5:0.10.1-0.25, 6:0.10.1-0.25, 6.5:0.10.1-0.25, 7:0.10.1-0.25, 7.5:0.10.1-0.25, 8:0.10.1-0.25, 8:5:0.10.1-0.25, to 9:0.10.1-0.25. In some aspects, the ratio of B:C in A:B:C can be about 1:0.1-0.25, 1:0.1-0.25, 1:0.1-0.25, 1:0.1-0.25, 1:0.1-0.25, 1:0.1-0.25, 1:0.1-0.25, 1:0.1-0.25, 1:0.1-0.25, 5:0.1-0.25, 4.5:0.1-0.25, 4:0.1-0.25, 3.5:0.1-0.25, 3:0.1-0.25, 2.5:0.1-0.25, 2:0.1-0.25, or 1:0.1-0.25.

In some aspects, the wt. % of the A block can range from 10-90 percent of the total weight percent of the A and B blocks. In some aspects, the wt. % of the A block can be 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt. % of the total weight percent of the A and B blocks. In some aspects, the wt. % of the B block can range from 10-90 percent of the total weight percent of the A and B blocks. In some aspects, the wt. % of the B block can be 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt. % of the total weight percent of the A and B blocks. The ABA triblock copolymer compatibilizer can be included at a wt. % of the total weight percent of the A and B blocks that can range from about 0.5 wt. % to about 10 wt. %. In some aspects, the ABA triblock copolymer compatibilizer can be included at 0.25, 0.5, 1, 1.5, 2, 2.5, 3, 3.5, 4, 4.5, 5, 5.5, 6, 6.5, 7, 7.5, 8, 8.5, 9, 9.5, or 10 wt. %.

In some aspects, the A block in the blend can be MC, the B block can be HDPE, and the compatibilizer used in the formation of the blend can be MC-b-HDPE-b-MC. In some aspects, the A block in the blend can be CTA, the B block can be PB or a photodegradable PB, and the compatibilizer used in the formation of the blend can be CTA-b-PB-b-CTA or CTA-b-modified PB-b-CTA. In some aspects the CTA-b-modified PB-b-CTA can be CTA-b-P(BD-co-COK)-b-CTA. In some aspects, the A block can be PLA, the B block can be a modified PB (P(BD-co-COK), and the compatibilizer used in formation of the blend can be PLA-b-P(BD-co-COK)-b-PLA.

In some aspects, the blends can be polysaccharide (PS)-polyolefin (PO) blends made with a PS-g-PO compatibilizer described herein. In some aspects, polyolefin can be PB and the graft copolymer compatibilizer can be polysaccharide-g-PB.

In additional to using the triblock copolymers and graft block copolymers described herein as compatibilizers, they can be used as copolymers that can be incorporated into various articles in any suitable application. In some aspects, the block copolymers described herein can be used as stand-alone thermoplastics (i.e. not as a compatibilizer) for any suitable application.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure. The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Example 1

Polysaccharides (PSs) are the most abundant natural polymers on earth that possess vast structural diversity, material properties, and biological functions. Cellulose is one of the simplest and most abundant PS composed of only glucose repeat units and makes up most of the weight of plant matter. Due to this abundance, cellular and its derivatives have many commercial applications, with billions of kilograms sold each year. However, PS applications are still limited due to their inherent brittleness and poor solubility. To broaden the scope of PS applications, polysaccharides have been functionalized (3-4), plasticized (5-6), and blended (7-11) to make new materials with improved properties. Nonetheless, blending of polysaccharides with polyolefins is a challenge, and as a result there are few successful examples in the prior art. These typically require complete functionalization of the original polysaccharide to make a miscible blend or have the poor properties of immiscible blends due to the difficulty of designing and making effective compatibilizers. This Example can demonstrate, inter alia, the synthesis of polysaccharide polyolefin ABA triblock copolymers that can be used as materials on their own or as compatibilizers to facilitate the synthesis of polyolefin/polysaccharide blends. This Example can specifically demonstrate synthesis of polysaccharide polyolefin ABA triblock copolymers and their use to synthesize cellulose triacetate (CTA) and polybutadiene (PB) blends referred to herein as Hi-C.

The development of a CTA-b-PB-b-CT ABA triblock copolymer was performed in a one-pot ring-opening metathesis polymerization (ROMP) reaction with cyclooctadiene (COD) as the monomer and mono-alkene-functionalized CTA as a chain transfer agent. Before polymerization, CTA was first monofunctionalized in two steps to attach an alkene group at the reducing end. In the first step, CTA was dissolved in CHCl₃ in a round bottom flask. HBr in acetic acid (about 33 wt. %) was added to the round bottom flask and the solution was allowed to stir for about 2 hours. This reaction can be run from a time period of about 20 minutes to about 2 hours. Longer reaction times can result in a smaller molecular weight polysacharride. (Scheme 1) Scheme 1 shows a synthesis scheme for the monofunctionalization of a polysaccharide. R in Scheme 1 can be Me, H, or Ac. This resulted in CTA with a bromine attached to the anomeric carbon on the reducing end (1). This resulted in a new shift in the $^1$H NMR spectrum (FIG. 1).

Scheme 1

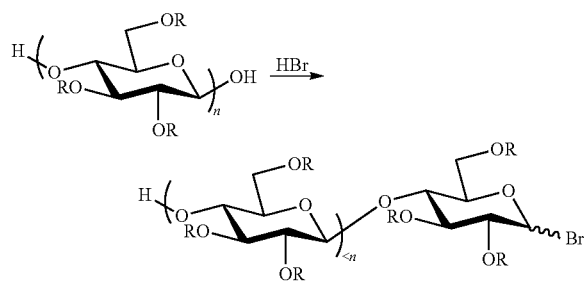

The monobrominated CTA (1) was then reacted with (for example) 10-undecen-1-ol (2) in the presence of 1,8-diazabicyclo[5.4.0]undec-7-ene (DBU) base (Scheme 2) in chloroform for 4 hours at room temperature. R in Scheme 2 represents H or Ac; g can range from 3 to 9. The disappearance of the Br proton peaks and the appearance of new alkene protons confirmed the addition of the alkene group to the reducing end of the CTA (1) and formation of (3) (FIG. 1).

Scheme 2

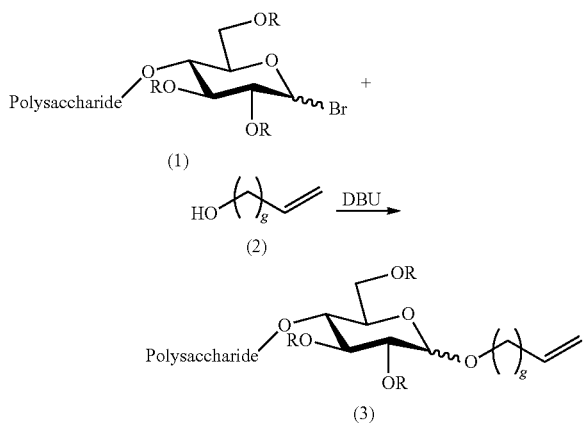

The ROMP of COD and CTA with the pendant alkene group was then performed with (H₂MES)(Cl)₂Ru=CH-o-OiPrPh (Hoveyda-Grubbs 2$^{nd}$ generation catalyst, HG2) (Scheme 3). Here, a round bottom flask was charged with a stir bar, CHCl₃, COD, and the alkene-functionalized CTA. Once dissolved, N₂ was then bubbled through the solution for about 15 minutes to eliminate oxygen. In a separate vial, an HG2 stock solution was prepared and an aliquot of the solution was injected into the round bottom flask. This solution was allowed to stir for about 24 hours at room temperature before precipitation into ethanol. R in Scheme 3 represents H or Ac. g can range from 3 to 9. m can represent 50 to 200.

Scheme 3

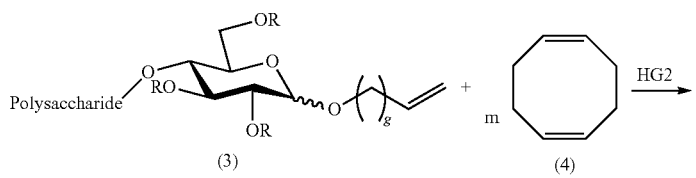

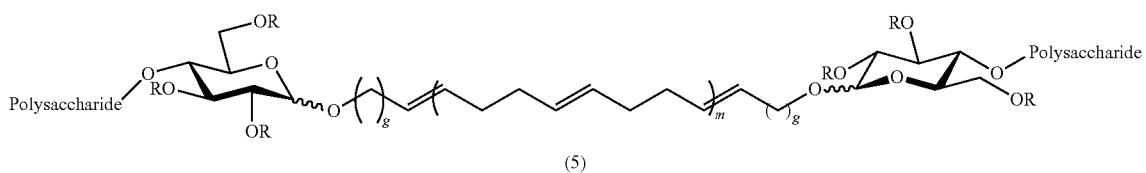

Figure 2:
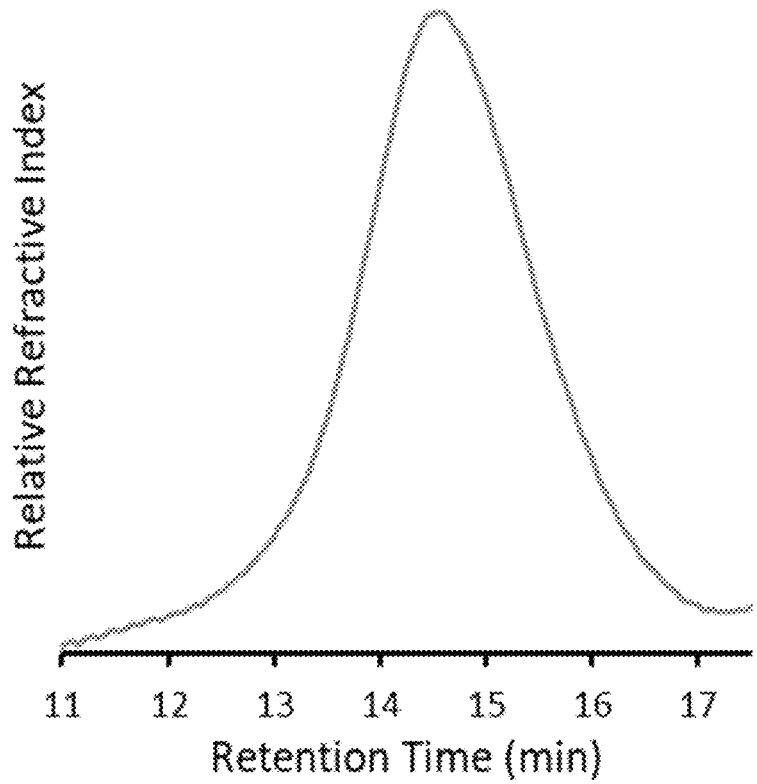
FIG. 2 shows a graph that can demonstrate size exclusion chromatography results of a CTA-b-PB-b-CTA ABA triblock copolymer.

The final ABA triblock copolymer was characterized by $^1$H NMR spectroscopy. Complete conversion of the alkene group found in the alkene functionalized CTA (FIG. 1) was observed. Next, the absolute molar mass of the triblock copolymer was determined by SEC, revealing a monomodal peak with an increase in molar mass (FIG. 2 and Table 1).

TABLE 1

Polymer Characterization

| Material | Mn (kDa) NMR | Mn (kDa) SEC | Dispersity |
|---|---|---|---|
| CTA-Vinyl | 12.7 | 12.5 | 2.3 |
| CTA-b-PB-b-CTA | 33.2 | 34.3 | 2.1 |

Figure 3:
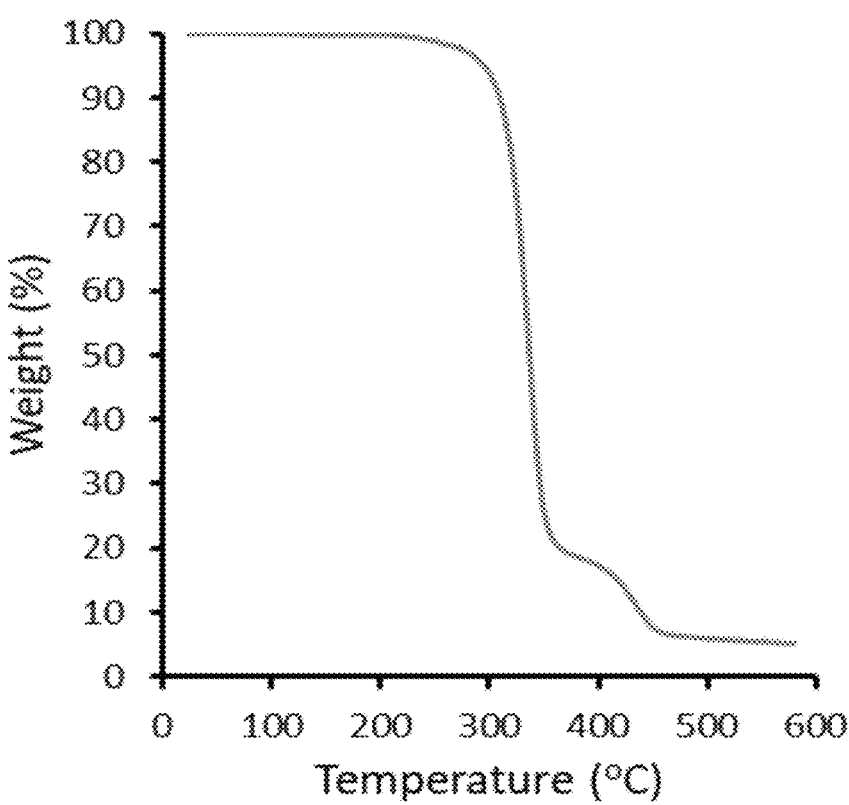
FIG. 3 shows a graph that can demonstrate a TGA (thermogravimetric analysis) trace of a CTA-b-PB-b-CTA ABA triblock copolymer from room temperature to about 660° C. with a heating rate of about 10° C. per minute. The onset of degradation was observed to occur at about 294° C.

The final polymer was observed to be stable up to about 294° C., as determined by thermal gravimetric analysis (TGA). Results are shown in FIG. 3. The TGA further confirmed the presence of a block copolymer by showing the degradation of CTA at about 294° C. and the degradation of PB centered at about 400° C. The final ABA triblock copolymer was then used to develop blends of CTA and PB. Blends were made using 90 wt. % CTA and 10 wt % PB. Of this total weight, 0, 1, 2.5, or 5 wt. % compatibilizer (5) was added to the blend. The nomenclature of the blend is referred to as 90:10:X, where 90 refers to the wt. % of CTA, 10 refers to the wet % of PB, and X refers to the wt. % of the compatibilizing ABA triblock copolymer added (e.g. (5)). The blends were then dissolved in chloroform to make a 5 wt. % solution. The solution was then used to cast blended films for mechanical and thermomechanical testing.

Figure 4:
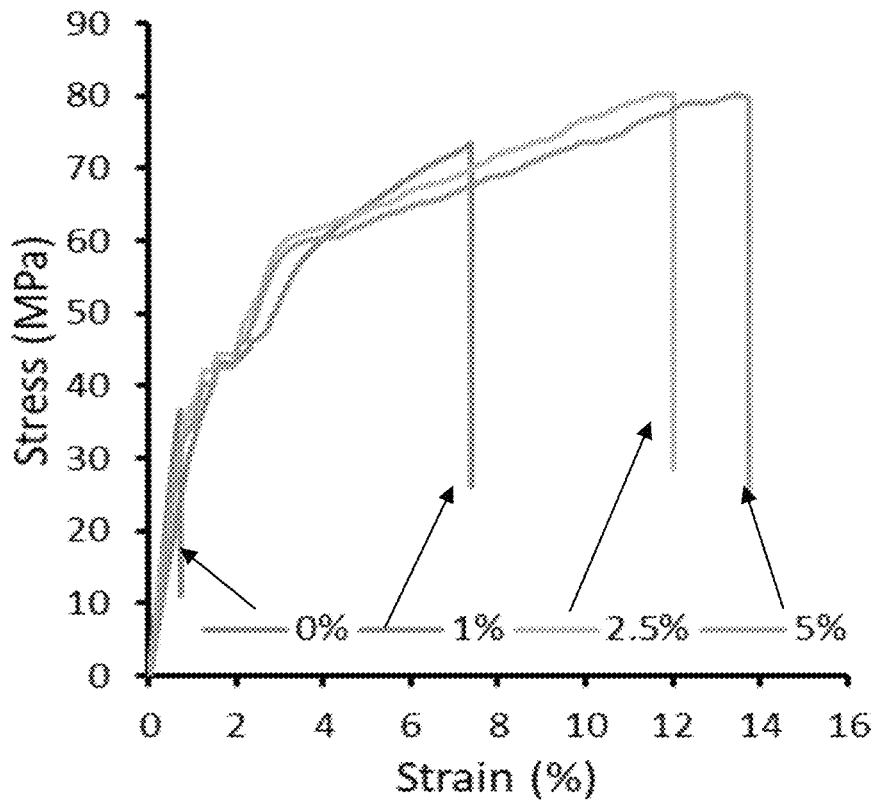
FIG. 4 shows a graph that can demonstrate results of an Instron tensile test of stress v. strain for PB and CTA blends with variable weight percent (wt. %) of ABA triblock copolymer compatibilizer. Tests were performed with accordance of ASTM D638 at a rate of about 5 mm per minute. Traces are representative of five runs per sample. 90:10 Hi-C series. 90:10-0; 90:10-1; 90:10-2.5; 90:10-5.

Tensile testing of the blends revealed a significant improvement in the elongation at break, ultimate tensile strength, and tensile modulus as more compatibilizer was added to the blends (FIG. 4 and Table 2). DMA of the films showed an improvement in modulus as more compatibilizer was added (FIG. 5 and Table 2) as well as a decrease in the tan delta centered around the glass transition temperature ($T_g$) of PB (FIG. 6). These parameters indicate improved physical properties and improved mixing of the CTA and PB phases.

TABLE 2

Tensile and Dynamic Mechanical Analysis Data

| Blend | Ultimate Tensile Strength (MPa) | Elongation at Break (%) | Modulus$^a$(MPa) | Modulus (MPa) at 25° C.$^b$ |
|---|---|---|---|---|
| 90:10:0 | 39.8 ± 2.2 | 0.87 ± 0.27 | 1480 ± 94 | 1430 |
| 90:10:1 | 71.3 ± 5.2 | 8.01 ± 2.6 | 1570 ± 75 | 1610 |
| 90:10:2.5 | 82.0 ± 2.4 | 11.8 ± 0.98 | 1800 ± 69 | 1740 |
| 90:10:5 | 81.1 ± 6.3 | 13.9 ± 1.4 | 1810 ± 66 | 1750 |

$^a$Determined by tensile testing at 5 mm/min based on the initial slope.
$^b$Determined by DMA at 25° C. at a frequency of 1 Hz.

REFERENCES FOR EXAMPLE 1

1. Klemm, D.; Heublein, B.; Fink, H. P.; Bohn, A., Cellulose: fascinating biopolymer and sustainable raw material. *Angewandte Chemie International Edition* 2005, 44 (22), 3358-3393.
2. Glasser, W. G. In 6. *Prospects for future applications of cellulose acetate*, Macromolecular symposia, Wiley Online Library: 2004; pp 371-394.
3. Fox, S. C.; Li, B.; Xu, D.; Edgar, K. J., Regioselective esterification and etherification of cellulose: a review. *Biomacromolecules* 2011, 12 (6), 1956-1972.
4. Schatz, C.; Lecommandoux, S., Polysaccharide-Containing Block Copolymers: Synthesis, Properties and Applications of an Emerging Family of Glycoconjugates. *Macromol. Rapid Commun.* 2010, 31 (19), 1664-1684.
5. Park, H.-M.; Misra, M.; Drzal, L. T.; Mohanty, A. K., "Green" nanocomposites from cellulose acetate bioplastic and clay: effect of eco-friendly triethyl citrate plasticizer. *Biomacromolecules* 2004, 5 (6), 2281-2288.
6. Avérous, L.; Fringant, C.; Moro, L., Plasticized starch-cellulose interactions in polysaccharide composites. *Polymer* 2001, 42 (15), 6565-6572.
7. Dave, V.; Tamagno, M.; Focher, B.; Marsano, E., Hyaluronic acid-(hydroxypropyl) cellulose blends: A solution and solid state study. *Macromolecules* 1995, 28 (10), 3531-3539.
8. Wu, Y.-B.; Yu, S.-H.; Mi, F.-L.; Wu, C.-W.; Shyu, S.-S.; Peng, C.-K.; Chao, A.-C., Preparation and characterization on mechanical and antibacterial properties of chitsoan/cellulose blends. *Carbohydrate Polymers* 2004, 57 (4), 435-440.
9. Khalf, A.; Nashar, D. E.; Maziad, N., Effect of grafting cellulose acetate and methylmethacrylate as compatibilizer onto NBR/SBR blends. *Materials & Design* (1980-2015) 2010, 31 (5), 2592-2598.
10. Kim, M., Evaluation of degradability of hydroxypropylated potato starch/polyethylene blend films. *Carbohydrate Polymers* 2003, 54 (2), 173-181.
11. Lomakin, S.; Rogovina, S.; Grachev, A.; Prut, E.; Alexanyan, C. V., Thermal degradation of biodegradable blends of polyethylene with cellulose and ethylcellulose. *Thermochim. Acta* 2011, 521 (1-2), 66-73.

Example 2

Polysaccharides (PSs) are the most abundant material on Earth, possessing vast structural diversity, thermomechanical properties, and biological functions (1). Due their abundance and high stiffness, PSs and their derivatives have found diverse applications commercially, with billions of kilograms sold each year (2). However, PS applications are still limited due to their inherent brittleness and poor processability. To broaden the scope of PS applications, PSs have been functionalized (3-4), plasticized (5-6), and blended (7-11) to make materials with improved properties. Nonetheless, toughening PS is still a challenge, reflected by the fact that there are few examples currently demonstrated in the field. This Example can demonstrate the synthesis of PS grafts from a polyolefin backbone for their use as thermoplastic elastomers (TPEs) or compatibilizers for PS and polyolefin blends.

The development of a PS-g-PB graft-copolymer can be performed by ring-opening metathesis polymerization (ROMP) of a monofunctionalized PS containing a cyclic olefin in the presence of cyclooctadiene (or a functionalized cyclooctene) and a Ru based ROMP catalyst. Any natural or synthetic PS can be used for the synthetic steps; however, for clarity cellulose and its derivatives are demonstrated in this Example. The reducing end of the PS can be monofunctionalized in two steps to attach a cyclic olefin resulting in a PS macromonomer for ROMP. In the first step (i.), a PS is dissolved and 33 wt. % HBr in acetic acid is added to the solution (Scheme 4) and reacted at room temperature for 20 minutes to 2 h CHCl$_3$ at room temperature. R$_1$ as shown in Scheme 4 can be any suitable cellulose ethers or esters. R1 can be methyl, ethyl, hydroxypropyl, C(O)CH$_3$, C(O)CH$_2$CH$_3$, C(O)CH$_2$CH$_2$CH$_3$, H and mixtures of different R groups (e.g., cellulose acetate butyrate has R$_1$=H, C(O)Ac, and C(O)CH$_2$CH$_2$CH$_3$. Common features of these R groups is that these are cellulose esters and ethers. The reactive acid causes chain cleavage at the acetal position along the PS backbone followed by immediate mono-bromination at the newly formed reducing end.

Scheme 4

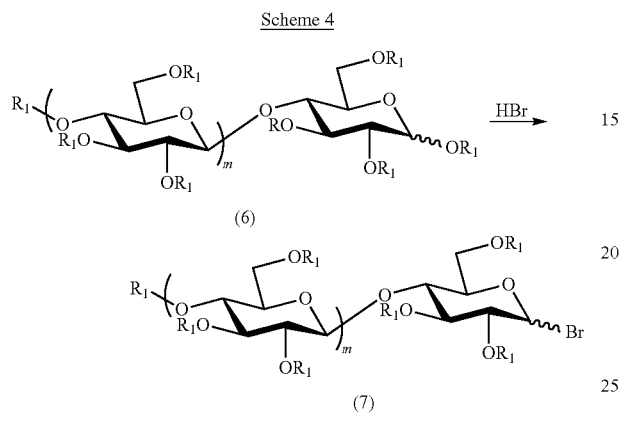

(6)

(7)

The mono-brominated PS (7) can then be reacted with a nucleophilic cyclic olefin and 1,8-diazabicyclo[5.4.0]undec-7-ene (DBU) to afford the PS macromonomer ((8), Scheme 5). With respect to R$_1$ shown in Scheme 5, R$_1$ is as previously defined with respect to Scheme 4. With respect to R$_2$ shown in Scheme 5, R$_2$ in Scheme 5 can be any suitable cellulose ethers or esters. In some aspects, R$_2$ can be methyl, ethyl, hydroxypropyl, C(O)CH$_3$, C(O)CH$_2$CH$_3$, C(O)CH$_2$CH$_2$CH$_3$, H and mixtures of different R groups (e.g., cellulose acetate butyrate has R$_1$=H, C(O)Ac, and C(O)CH$_2$CH$_2$CH$_3$. Common features of these R groups is that these are cellulose esters and ethers.

Scheme 5

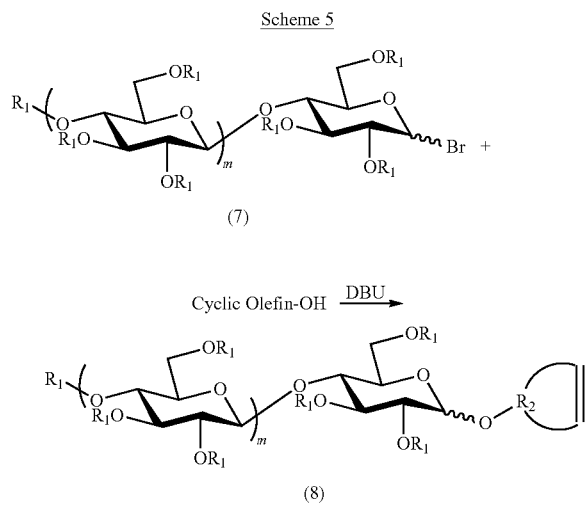

(7)

Cyclic Olefin-OH $\xrightarrow{DBU}$ (8)

Here, different pendant cyclic olefins attached to the PS macromonomer can be used and can afford different graft-copolymers. Exemplary pendant cyclic olefins are shown by compounds (9)-(12).

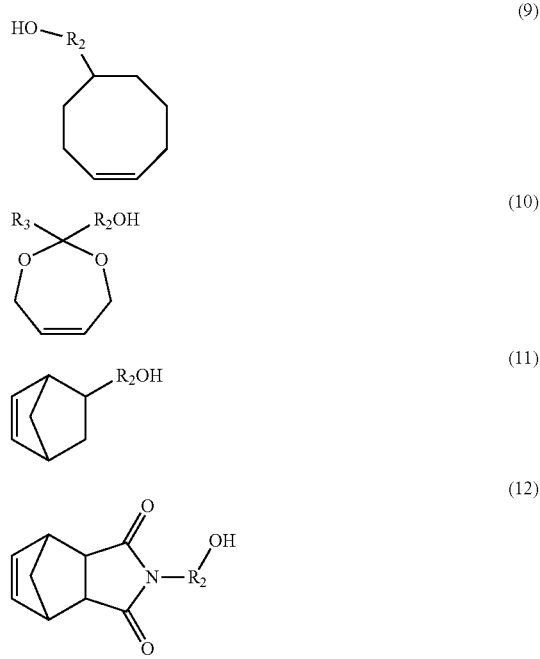

In compounds (9)-(12), R$_2$ in compounds (9)-(12) can each be selected from the group of an Alkyl, aryl, ester, amide, and oligoethylene glycol. In compound (10), R$_3$ can be CH$_3$, H, an alkyl, aryl, ester, or an amide. Cyclic olefins (9) and (10) can afford a macromonomer with similar reactivity as the monomer during the graft copolymer polymerization, and can result in a random or statistical copolymerization. Cyclic olefin (10) can afford a pH degradable linkage, allowing for the depolymerization of the graft copolymer to a selective trigger. The norbornene based cyclic olefins can afford a higher reactive macromonomer compared to the cyclooctene monomers. This can result in blocky graft-copolymers, which can have different thermomechanical and compatibilization properties as compared to the random graft copolymers. The resulting PS macromonomer with the selected cyclic olefin can then be polymerized with cyclooctadiene, a functionalized cyclooctene, Cyclooctene, cyclooctadiene, and alkyl-substituted or aryl-substituted versions of these, and a Ru metathesis catalyst, resulting in the graft-copolymer ((14), Scheme 6). The reaction can be performed at a temperature of about 10° C. to about 80° C. in a suitable solvent. Suitable solvents can include, CH$_2$Cl$_2$, CHCl$_3$, THF, alcohols, DMF, DMSO, toluene, benzene, and mixtures of these with or without H$_2$O. The reaction time can be from 20 minutes to 24 hours. Reaction catalysts can include Grubbs 1st and 2nd generation catalyst and Grubbs-Hoveyda 2nd generation catalyst. m in Scheme 6 can range from 20 to 500. n in Scheme 6 can range from 10 to 100. p in Scheme 6 can range from 1-50. r in Scheme 6 can range 50-1000. R$_1$ is as previously defined with respect to Scheme 4. R$_1$ is as previously defined with respect to Scheme 6.

Scheme 6

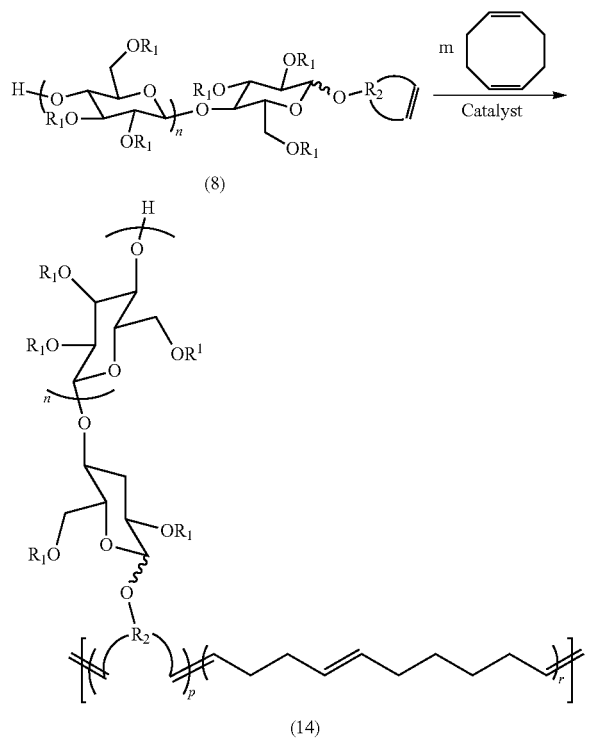

(8)

(14)

REFERENCES FOR EXAMPLE 2

1. Klemm, D.; Heublein, B.; Fink, H. P.; Bohn, A., Cellulose: fascinating biopolymer and sustainable raw material. *Angewandte Chemie International Edition* 2005, 44 (22), 3358-3393.
2. Glasser, W. G. In 6. *Prospects for future applications of cellulose acetate*, Macromolecular symposia, Wiley Online Library: 2004; pp 371-394.
3. Fox, S. C.; Li, B.; Xu, D.; Edgar, K. J., Regioselective esterification and etherification of cellulose: a review. *Biomacromolecules* 2011, 12 (6), 1956-1972.
4. Schatz, C.; Lecommandoux, S., Polysaccharide-Containing Block Copolymers: Synthesis, Properties and Applications of an Emerging Family of Glycoconjugates. *Macromol. Rapid Commun.* 2010, 31 (19), 1664-1684.
5. Park, H.-M.; Misra, M.; Drzal, L. T.; Mohanty, A. K., "Green" nanocomposites from cellulose acetate bioplastic and clay: effect of eco-friendly triethyl citrate plasticizer. *Biomacromolecules* 2004, 5 (6), 2281-2288.
6. Avérous, L.; Fringant, C.; Moro, L., Plasticized starch-cellulose interactions in polysaccharide composites. *Polymer* 2001, 42 (15), 6565-6572.
7. Dave, V.; Tamagno, M.; Focher, B.; Marsano, E., Hyaluronic acid-(hydroxypropyl) cellulose blends: A solution and solid state study. *Macromolecules* 1995, 28 (10), 3531-3539.
8. Wu, Y.-B.; Yu, S.-H.; Mi, F.-L.; Wu, C.-W.; Shyu, S.-S.; Peng, C.-K.; Chao, A.-C., Preparation and characterization on mechanical and antibacterial properties of chitsoan/cellulose blends. *Carbohydrate Polymers* 2004, 57 (4), 435-440.
9. Khalf, A.; Nashar, D. E.; Maziad, N., Effect of grafting cellulose acetate and methylmethacrylate as compatibilizer onto NBR/SBR blends. *Materials & Design* (1980-2015) 2010, 31 (5), 2592-2598.
10. Kim, M., Evaluation of degradability of hydroxypropylated potato starch/polyethylene blend films. *Carbohydrate Polymers* 2003, 54 (2), 173-181.
11. Lomakin, S.; Rogovina, S.; Grachev, A.; Prut, E.; Alexanyan, C. V., Thermal degradation of biodegradable blends of polyethylene with cellulose and ethylcellulose. *Thermochim. Acta* 2011, 521 (1-2), 66-73.

Example 3

Figure 8:
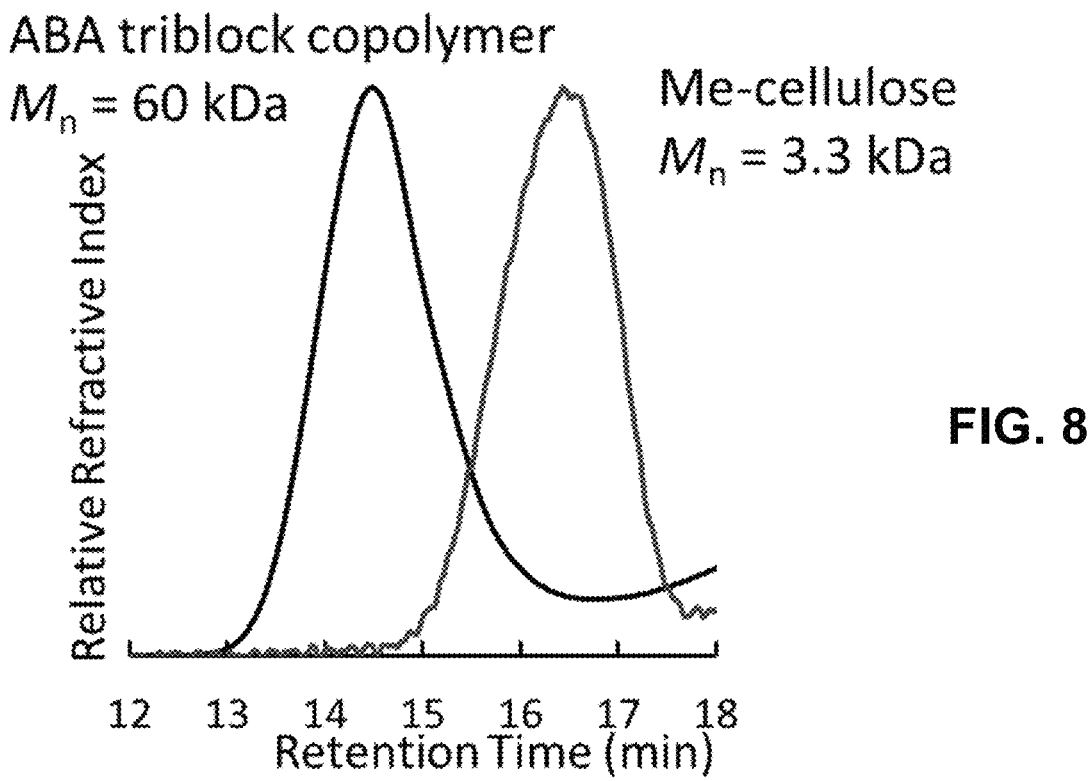
FIG. 8 shows a graph that shows the chromatogram of ABA triblock copolymer (MC-b-HDPE-b-MC) and MC precursor
Figure 9:
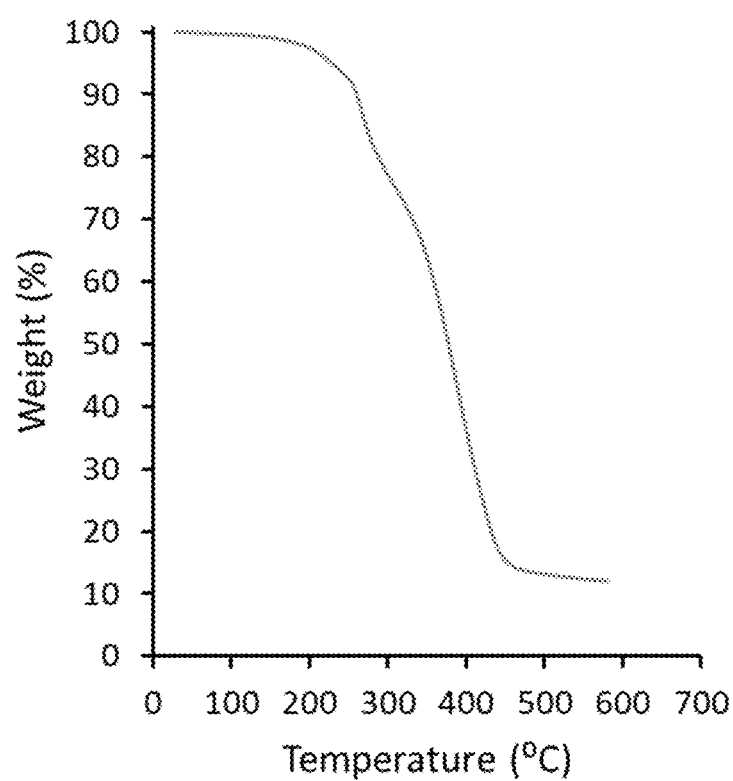
FIG. 9 shows a graph that can demonstrate TGA results for a MC-b-HDPE-b-MC ABA triblock copolymer. TGA was performed with a heating rate of 10° C. per minute.
Figure 10:
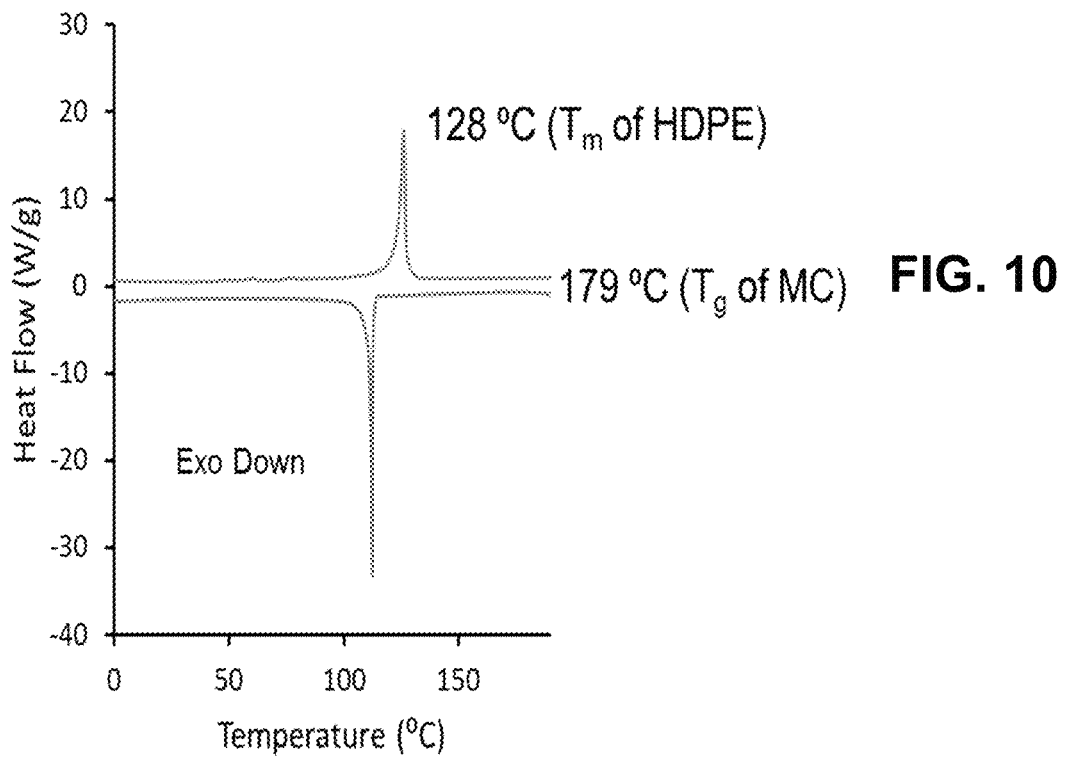
FIG. 10 shows a graph that can demonstrate DSC results for a MC-b-HDPE-b-MC ABA triblock copolymer. DSC was performed with a $2^{nd}$ heating step having a rate of heating of 10° C. per minute.

Scheme 14 shows a generic scheme for ROMP for generation of an olefin terminated methyl cellulose that can be used to make ABA triblock copolymers. m and n in Scheme 14 can each independently range from 10-500. A methyl cellulose (MC)/HPDE ABA triblock copolymer was generated according to Scheme 15. m can equal n in Scheme 15 and can range from 10-500. p can range from 20-1000 in Scheme 15. FIG. 8 shows a graph that shows the chromatogram of ABA triblock copolymer (MC-b-HDPE-b-MC) and MC precursor. TGA and DSC were performed to evaluate the MC-b-HDPE-b-MC ABA triblock copolymer. TGA was performed with a heating rate of 10° C. per minute. DSC was performed with a $2^{nd}$ heating step having a rate of heating of 10° C. per minute. TGA results are shown in FIG. 9. DSC results are shown in FIG. 10. The MC-b-HDPE-b-MC ABA triblock copolymer was observed to have both the $T_m$ for HDPE (about 126° C.) and the $T_g$ for MC (about 179° C.).

Scheme 14

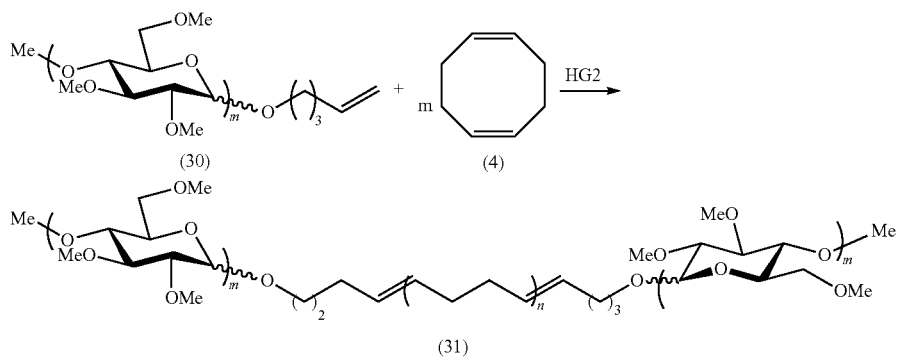

(30)  (4)

(31)

Scheme 15

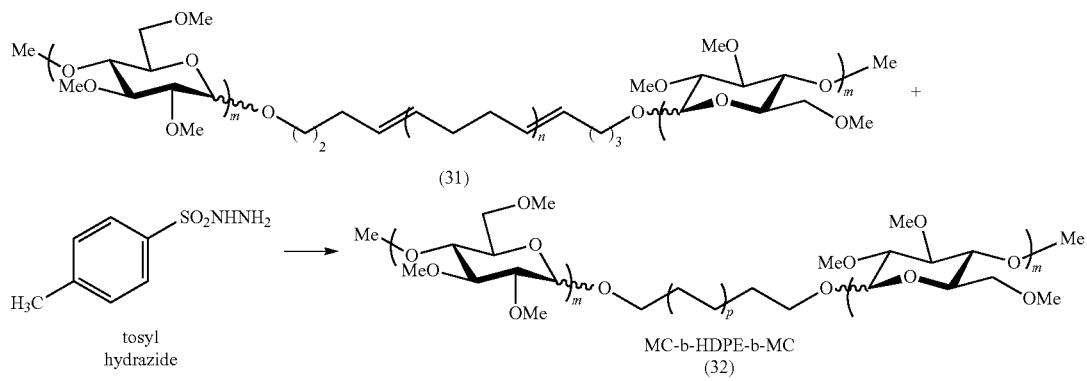

Figure 11:
FIG. 11 shows a photographic image of different 80:20 HDPE:MC blends made with 0 or 2.5% MC-b-HDPE-b-MC ABA triblock copolymer compatibilizer.
Figure 12:
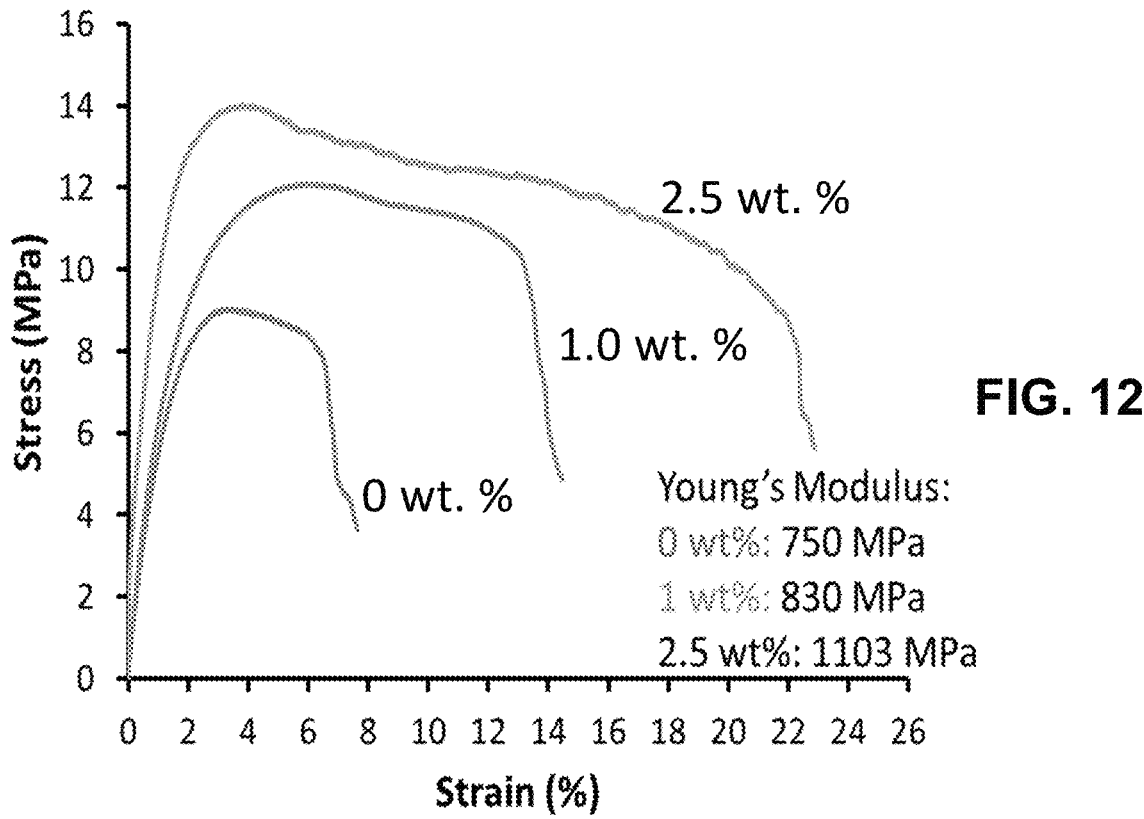
FIG. 12 shows a graph that can demonstrate results from a tensile test of 90:10 HDPE:MC blends made with varying amounts of a MC-b-HDPE-b-MC ABA triblock copolymer compatibilizer.
Figure 13:
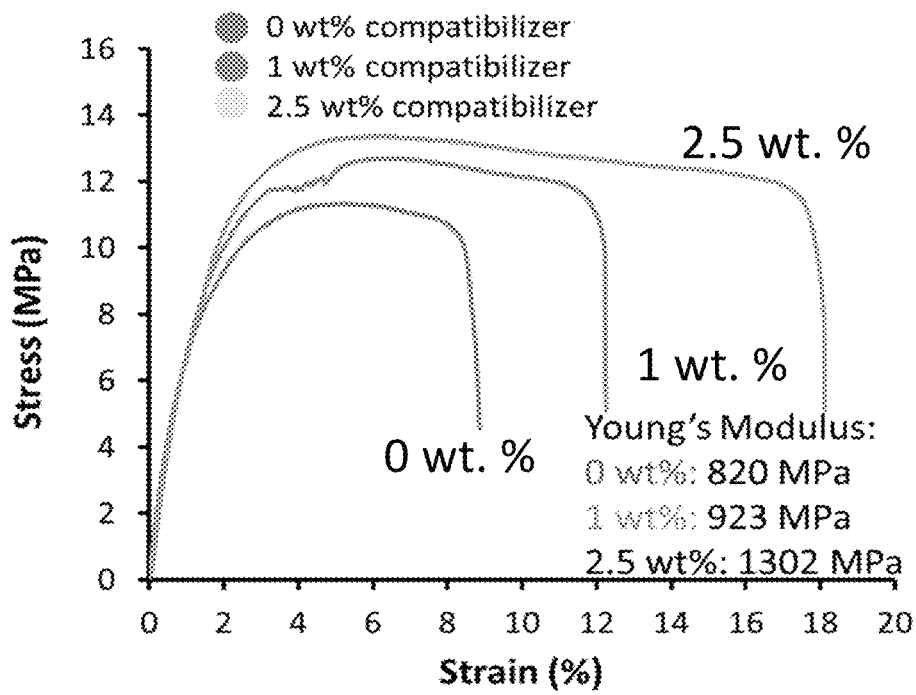
FIG. 13 shows a graph that can demonstrate results from a tensile test of 80:20 HDPE:MC blends made with varying amounts of a MC-b-HDPE-b-MC ABA triblock copolymer compatibilizer.

The MC-b-HDPE-b-MC ABA triblock copolymer can be used as a compatiblizer to make polymer blends. As an example, HDPE and MC can be blended using a MC-b-HDPE-b-MC ABA triblock copolymer compatibilizer according to Scheme 16. m, n, and p can be the same values as noted for Scheme 15. Various wt. % HDPE:MC blends were made using various amounts of MC-b-HDPE-b-MC ABA triblock copolymer compatibilizer (Scheme 16, Table 5). FIG. 11 shows a photographic image of different 80:20 HDPE:MC blends made with 0 or 2.5% MC-b-HDPE-b-MC ABA triblock copolymer compatibilizer.

properties of 80:20 HDPE:MC blends made with varying amounts of a MC-b-HDPE-b-MC ABA triblock copolymer compatibilizer, highlighting brittle fracture for the uncompatibilized blend and ductile fracture for the compatibilized blend. Compatibilization of 50:50 HDPE:MC blends was observed to increase modulus from 820 MPa to 1200 MPa and strain at break from about 2-5% (FIG. 12). FIG. 12 shows an average based on 5 runs at a 1 mm per minute strain rate. Compatibilization of 80:20 HDPE:MC blends was observed to increase strain at break from about 7% to about 9% without affecting modulus (FIG. 13). FIG. 13

Scheme 16

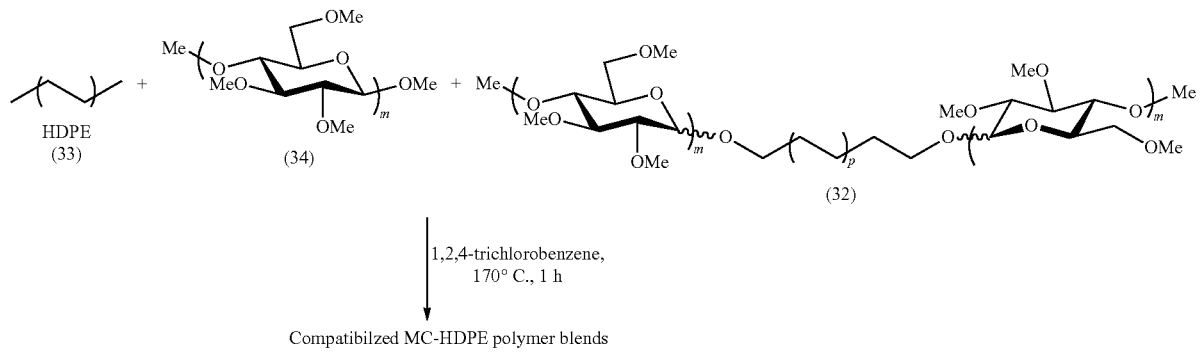

TABLE 5

| Sample ID | wt. % HDPE | wt. % MC | Additional % compatibilizer |
|---|---|---|---|
| 50:50:0 | 50 | 50 | 0 |
| 50:50:1% | 50 | 50 | 1 |
| 50:50:2.5% | 50 | 50 | 2.5 |
| 80:20:0% | 80 | 20 | 0 |
| 80:20:1% | 80 | 20 | 1 |
| 80:20:2.5% | 80 | 20 | 2.5 |

Figure 14:
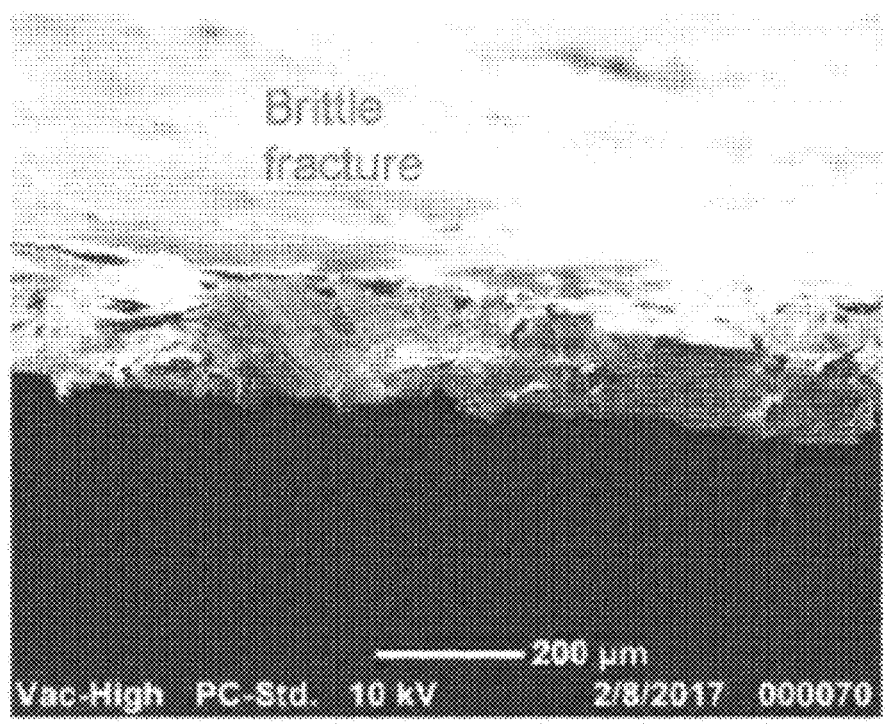
FIG. 14 shows a scanning electron microscopy (SEM) image of the edge of a of 80:20 HDPE:MC blend made without a compatibilizer.
Figure 15:
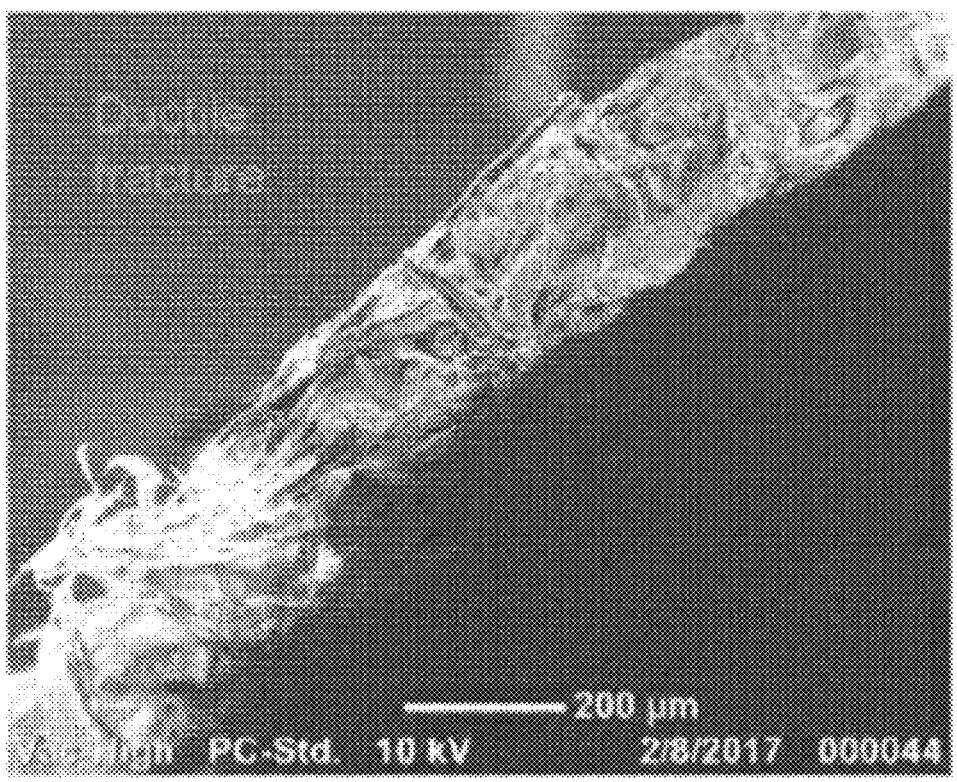
FIG. 15 shows a scanning electron microscopy (SEM) image the edge of a of 80:20 HDPE:MC blend made with 2.5 wt. % of a MC-b-HDPE-b-MC ABA triblock copolymer compatibilizer.

Tensile properties of the blends were also examined using strain tests. FIG. 12 shows results from the 50:50 HDPE:MC blends made with varying amounts of a MC-b-HDPE-b-MC ABA triblock copolymer compatibilizer. FIG. 13 shows results from the 80:20 HDPE:MC blends made with varying amounts of a MC-b-HDPE-b-MC ABA triblock copolymer compatibilizer. FIGS. 14-15 show scanning electron microscopy (SEM) images showing the interfacial mechanical shows an average based on 5 runs at a 1 mm per minute strain rate. As can be demonstrated by FIGS. 14-15, brittle fracture was observed when no compatibilizer is included. This is indicative of poor interfacial mechanical properties. When 2.5% of a MC-b-HDPE-b-MC ABA triblock copolymer compatibilizer was included in the blend, ductile fracture was observed, which is indicative of small domains within stabilized interfaces.

Example 5

Introduction.

Plastic waste is a growing environmental problem, particularly in the ocean,[1-3] which has led to the call for new polymeric materials with increased sustainability.[4] Biodegradable polysaccharides could provide solutions to this problem. A key example is cellulose, a highly abundant polymeric material with an estimated annual biomass production of 1.5×10¹² tons.⁵ Compared to the annual global production of plastics at 2.8×10⁸ tons in 2015,⁶ cellulose is a virtually inexhaustible, renewable source of polymeric materials. Due to this abundance, cellulose and its derivatives have found many applications commercially, with billions of kilograms sold per year.⁷ However, applications for cellulose and other polysaccharides are limited due to issues including inherent brittleness and poor processability. To broaden the scope of polysaccharide applications, researchers have functionalized,[8-9] plasticized,[10-11] and blended[12-16] polysaccharides to make new materials with improved thermomechanical properties. Despite this progress, new methods are needed to improve the toughness of polysaccharides, enhance their application scope, and create alternatives that support the vision of a more sustainable planet.

Enhancing polymer toughness can be accomplished efficiently and economically through blending. However, blending polymers without any additives usually results in phase separation between the polymers when mixed.[17] These phase-separated domains typically provide properties inferior to those of the parent polymers, due to lack of adhesion between domains.[18-19] To combat the lack of adhesion between polymer phases, compatibilization with copolymer additives can enhance interfacial cohesion and dramatically improve mechanical properties in polymer blends. For example, high impact polystyrene (HIPS) is a commercial polymer blend of polystyrene (PS) and polybutadiene (PB) compatibilized by a small amount of a PS-graft-PB copolymer.[20] In general, efficient polymer blending can be achieved with 1-5 wt % of a compatibilizing graft or block(y) copolymer for improved thermomechanical blend properties.[19] Blending PB with cellulose-derived polymers could provide a new method for toughening polysaccharides. This could further broaden their application scope, providing a sustainable alternative to traditional plastics by simple blending combined with the addition of 1-5 wt % of a copolymer compatibilizer. However, to date no blends of PB and cellulose or cellulose derivatives have been reported, likely due to a lack of effective compatibilizers. Cellulose triacetate (CTA) is one of the most common cellulose derivatives, originally gaining market popularity as a safe alternative to nitrocellulose film.[21] It is now used widely as a polarizer film for LCD screens.[22] However, applications of CTA, as for many cellulose derivatives, are limited by a lack of toughness.

Without being bound by theory, a CTA/PB polymer blend could dramatically enhance the (thermo)mechanical properties of CTA, provided that the CTA and PB phases were appropriately compatibilized. This Example can demonstrate the synthesis of an ABA triblock copolymer of CTA (A block) and PB (B block) by preparing mono-olefin terminated CTA, then using this functional CTA polymer as a macro chain-transfer agent in ring-opening metathesis polymerization (ROMP). We then evaluate the effect of this ABA triblock copolymer as a compatibilizer of CTA and PB in polymer blends. This Example also refers to these new blends as high impact cellulose triacetate (Hi-C).

Results and Discussion.
Synthesis of CTA-b-PB-b-CTA.

Figure 21:
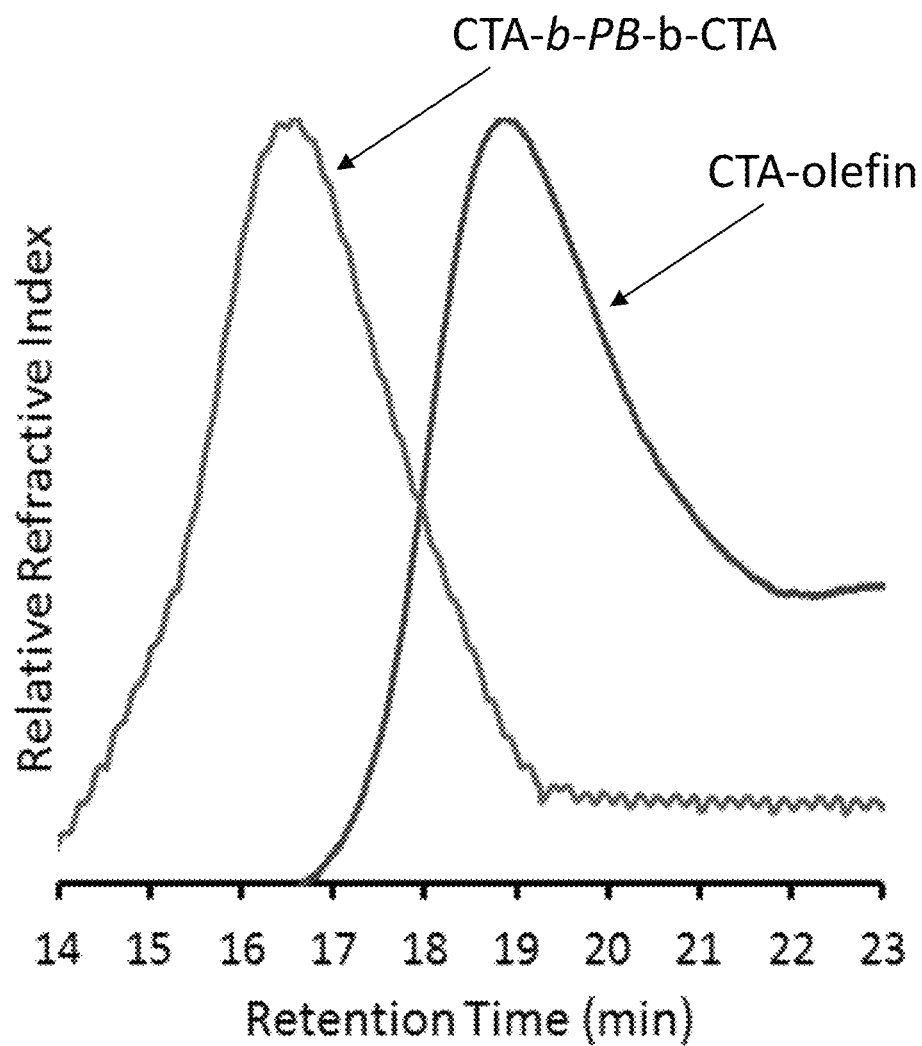
FIG. 21 shows a SEC in CHCl$_3$ (relative to PS standards), showed a clear shift in retention time from CTA-olefin, with $M_n$=32.4 kg/mol at Đ=2.3

Synthesis of an ABA triblock copolymer of the structure CTA-b-PB-b-CTA was completed in three steps. First, CTA was treated with HBr in a chain degradation reaction to add a single glycosidic Br atom on the reducing end, forming CTA-Br (Scheme 17). ¹H NMR spectroscopy showed a diagnostic anomeric proton ($H_A$) on the reducing end at 6.5 ppm, which is consistent with literature values (FIG. 1).[25] $M_n$ determined by ¹H NMR end group analysis revealed a molar mass of 12.7 kg/mol, while size exclusion chromatography in CHCl₃ (SEC, relative to PS standards) gave a similar $M_n$ of 12.5 kg/mol and Đ=2.3 (FIG. 21). Next, reducing end halogen displacement of CTA-Br by undec-10-en-1-ol in the presence of DBU base appended an olefin to the reducing end of CTA. We envisioned that this polymer, termed CTA-olefin, could be used as a chain transfer agent in the ROMP of cyclooctadiene (COD), which is chemically equivalent to 1,4-PB. ¹H NMR spectroscopy confirmed successful replacement of the glycosidic bromide as indicated by complete disappearance of the CTA-Br anomeric proton and appearance of new vinylic and anomeric protons, at 5.8 and 6.2 ppm, respectively (FIG. 1).

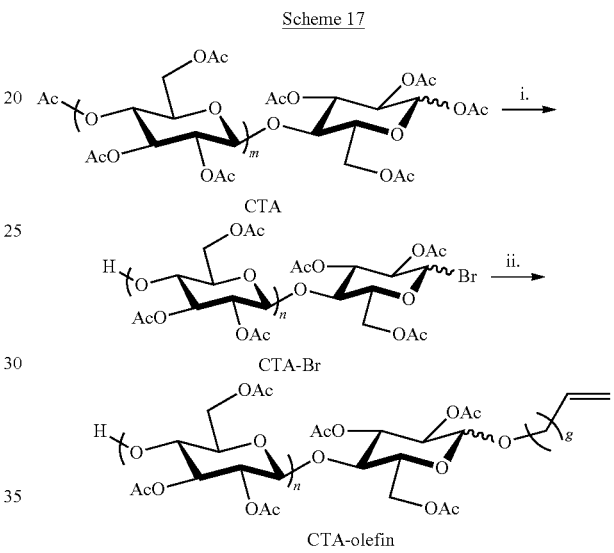

Scheme 17

Conditions:
i. 33 wt % HBr in acetic acid, CHCl₃, rt, 20 min.
ii. undec-10-en-1-ol, DBU, CHCl₃, rt, 4 h.

Figure 22:
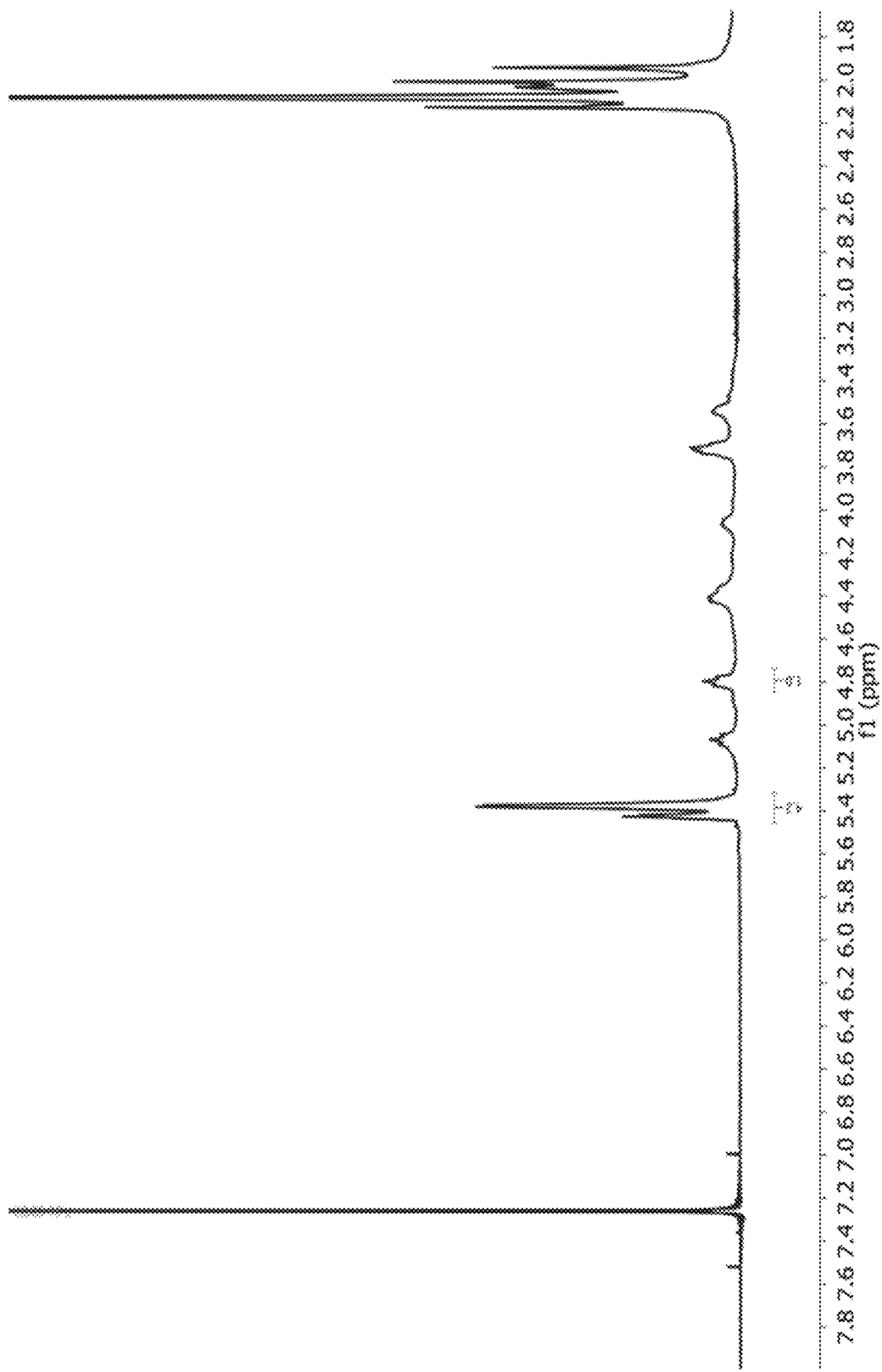
FIG. 22 shows results of $^1$H NMR spectral integration of a the polymer that was 28 wt % PB block.

In the final step, ROMP of COD in the presence of CTA-olefin, (200:1:0.01 COD/CTA-olefin/HG2) was carried out using (H₂IMes)(Cl)₂Ru=CH-o-OiPrPh (Hoveyda-Grubbs second-generation catalyst, HG2) in CHCl₃ (Scheme 18). COD was distilled prior to use to remove vinyl cyclohexene, a known ROMP chain transfer agent.[26] After 24 h, the polymerization proceeded to 95% monomer conversion as determined by ¹H NMR spectroscopy. The resulting polymer was purified by precipitation into EtOH. Complete consumption of the pendant vinyl group on CTA-olefin was indicated by ¹H NMR spectroscopy, and CTA-b-PB-b-CTA, was soluble in THF, permitting SEC analysis in THF with light scattering detection. The ABA triblock copolymer had an $M_n$ of 34.3 kg/mol with Đ=2.1, permitting calculation of PB midblock $M_n$, which was 9.2 kg/mol (27 wt. %), close to the targeted $M_n$ of 10.8 kg/mol (FIG. 2). In addition, SEC in CHCl₃ (relative to PS standards), showed a clear shift in retention time from CTA-olefin, with $M_n$=32.4 kg/mol at Đ=2.3 (FIG. 21). By ¹H NMR spectral integration, the polymer was 28 wt % PB block, close to the value determined by SEC analysis (FIG. 22). The cis/trans ratio was 77/23, which in our experience is sufficient cis content to retain the elasticity of cis-1,4-PB.

Thermogravimetric analysis (TGA) of CTA-b-PB-b-CTA displayed two very distinct thermal degradations (FIG. 3). The onset of thermal degradation, defined as the temperature associated with 5% weight loss, occurred at 294° C. Without being bound by theory, this mass loss can be attributed to thermal degradation of CTA. The next feature occurred at 365° C. with 22 wt % of the initial mass remaining and is consistent with the thermal degradation of PB. This value is close to the % PB values determined by SEC and $^1$H NMR.

CTA/PB Blend Preparation and Characterization

Figure 23:
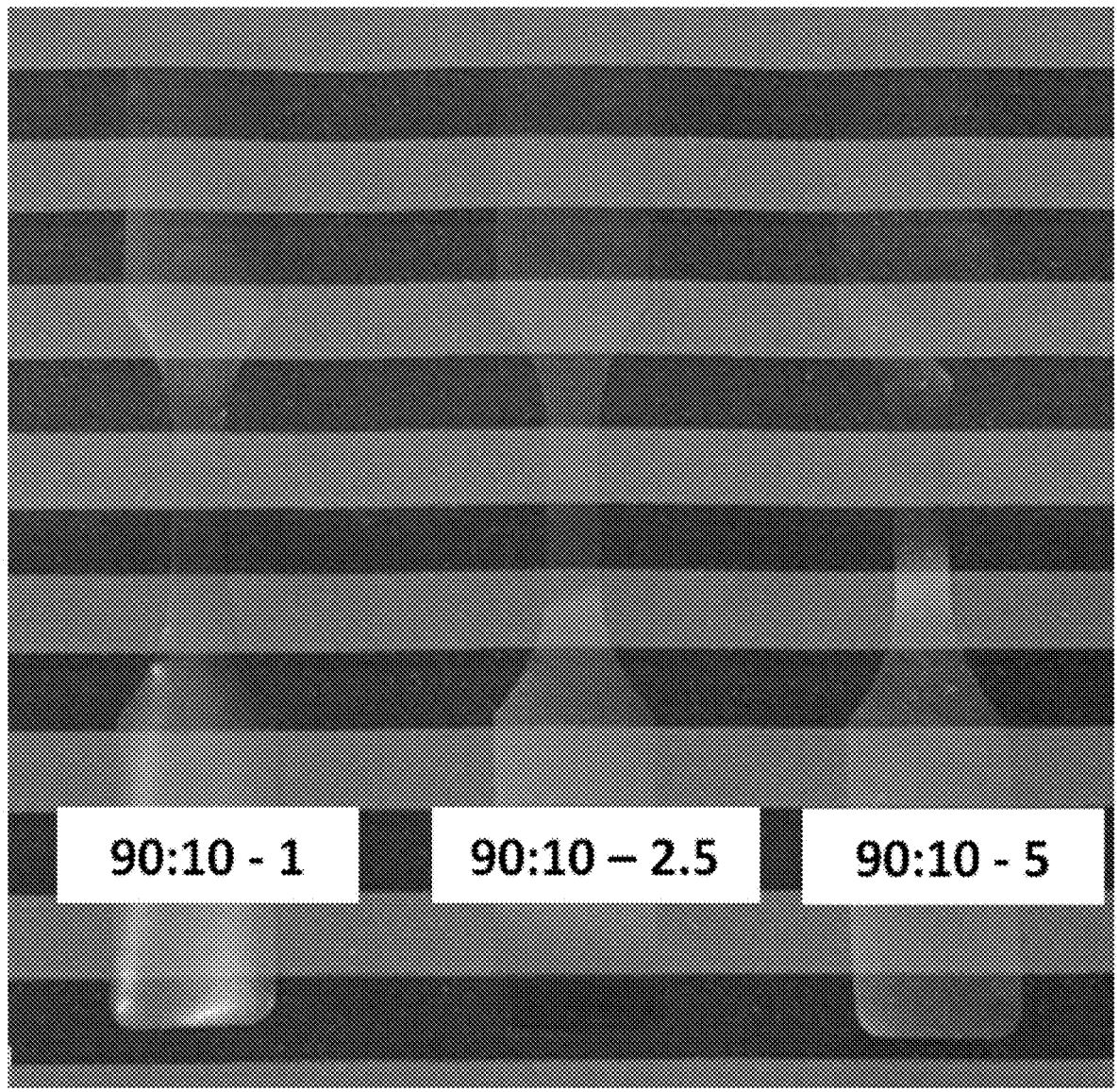
FIG. 23 shows a graph that can demonstrate the effect of the wt % of MC increase to make the 80:20-2.5 film on oxygen permeability.
Figure 24:
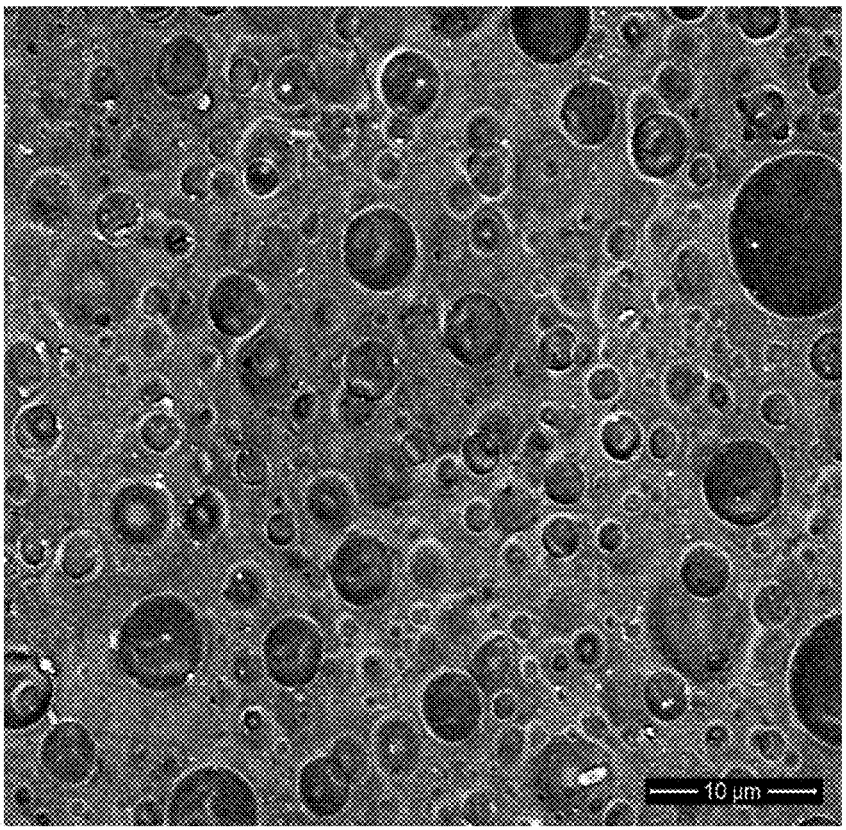
FIG. 24 shows an SEM image at 5000× magnification of 80:20-0. Dark circles are PB in a matrix of light colored CTA.
Figure 25:
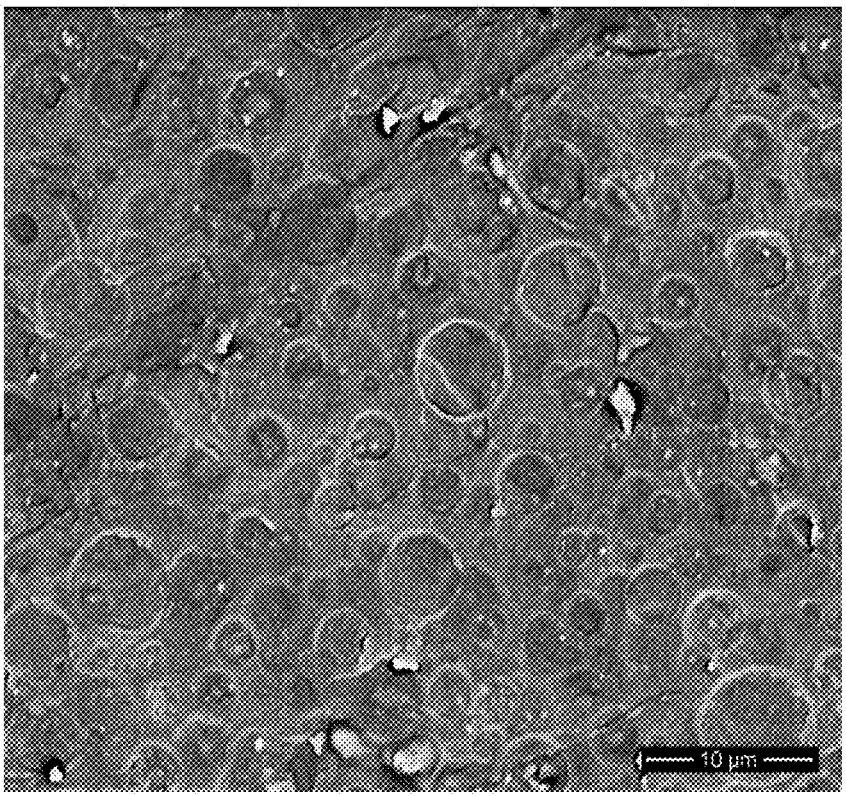
FIG. 25 shows SEM image at 5000× magnification of 80:20-1. Dark circles are PB in a matrix of light colored CTA.
Figure 26:
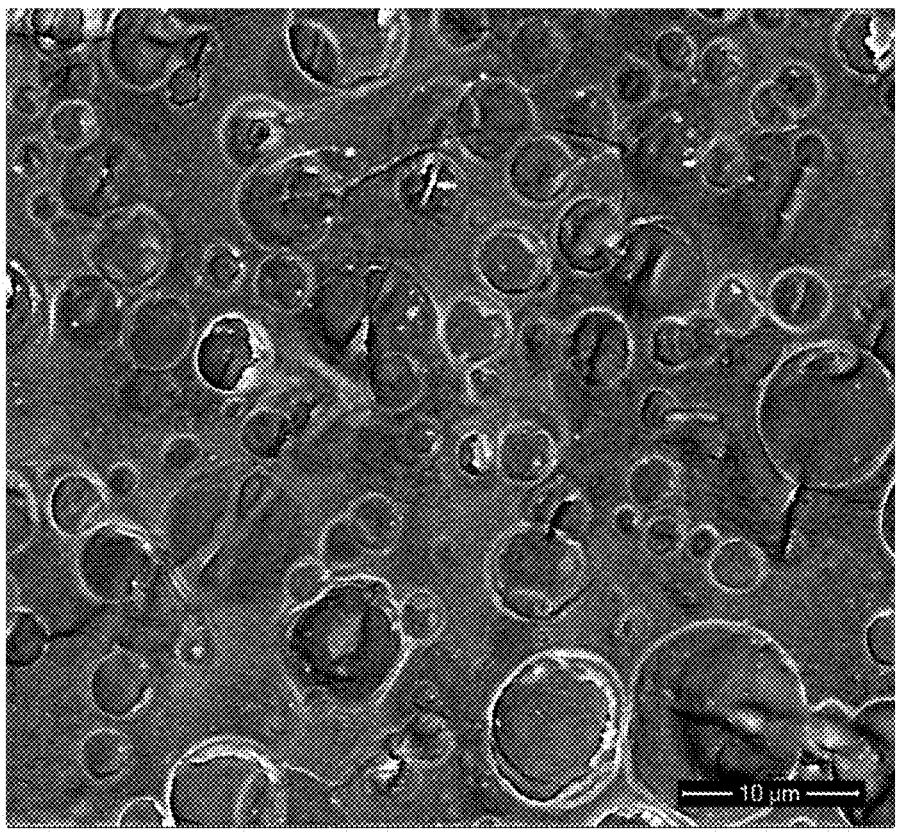
FIG. 26 shows SEM image at 5000× magnification of 80:20-2.5. Dark circles are PB in a matrix of light colored CTA.
Figure 27:
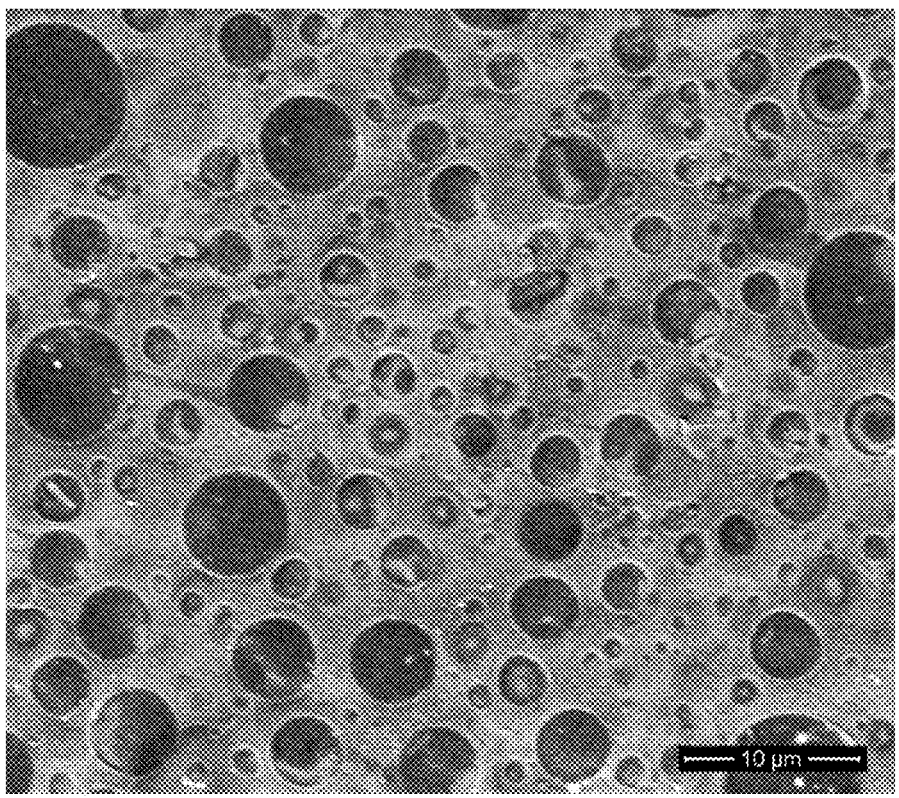
FIG. 27 shows SEM image at 5000× magnification of 80:20-5. Dark circles are PB in a matrix of light colored CTA.
Figures 28, 29:
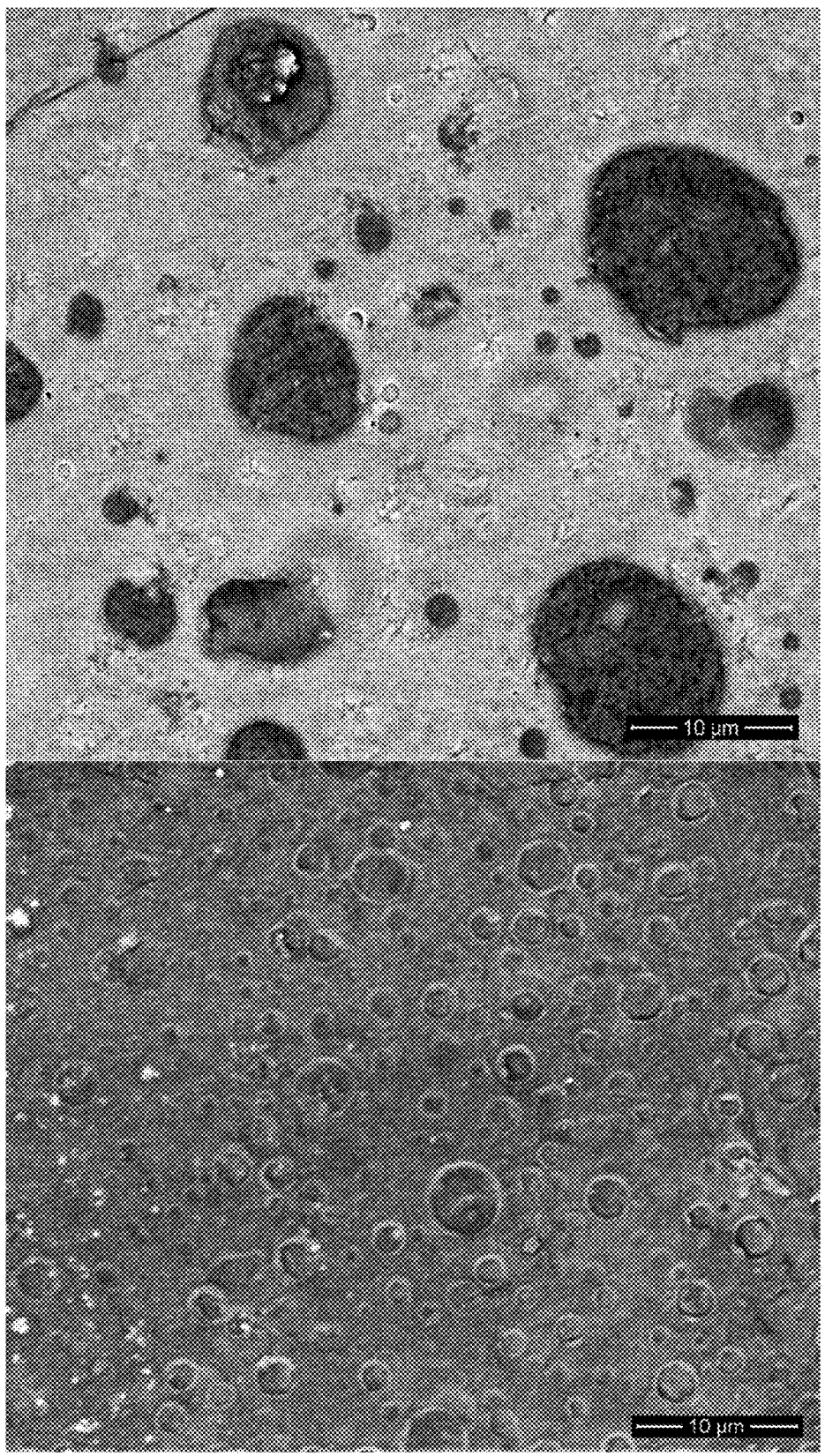
FIG. 28 shows SEM image at 5000× magnification of 90:10-0. Dark circles are PB in a matrix of light colored CTA.
FIG. 29 shows SEM image at 5000× magnification of 90:10-1. Dark circles are PB in a matrix of light colored CTA.
Figure 30:
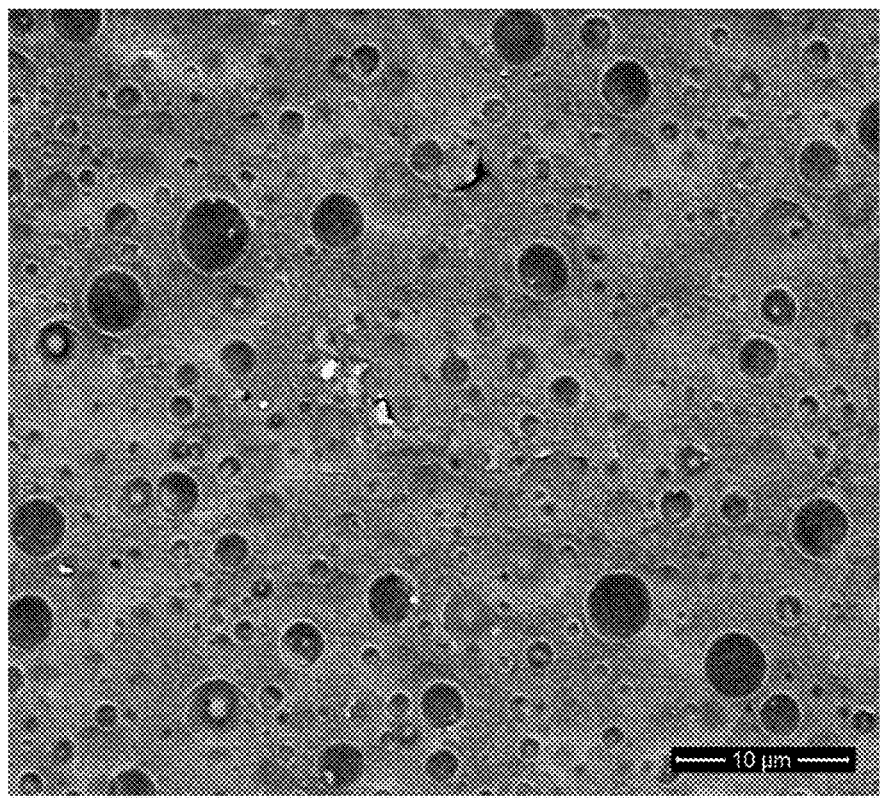
FIG. 30 shows SEM image at 5000× magnification of 90:10-2.5. Dark circles are PB in a matrix of light colored CTA.

Hi-C films were prepared by solution casting from CHCl$_3$. Here, the desired amounts of CTA, PB, and CTA-b-PB-b-CTA were dissolved in CHCl$_3$ to make a 5 wt % solution, followed by casting of the homogeneous solution onto glass plates. These blends are labeled XX:YY-ZZ, where XX is the wt % of CTA, YY is the wt % of PB, and ZZ is the wt % of CTA-b-PB-b-CTA added to the total mass of the CTA PB blend. Two series of Hi-C blends were formulated: a 90:10 series and an 80:20 series with the addition of 0, 1, 2.5, and 5 wt % of compatibilizer to each. Visually, the compatibilized films were clear and colorless (FIG. 23). These films were used in all subsequent testing.

Hi-C samples for the 90:10 series were first characterized by tensile testing at 5 mm/min. Results revealed increased ultimate tensile strength, elongation at break, modulus, and toughness upon addition of the copolymer compatibilizer (FIG. 4 and Table 6). With no CTA-b-PB-b-CTA, blend 90:10-0 readily snapped at low strains (<1%). This was expected because PB and CTA are immiscible, and without the addition of an interfacial agent, polymer blends tend to fracture easily along phase separated interfaces.[28] Blend 90:10-1 showed a relative increase of 1.8-fold in ultimate tensile strength and a 9.2-fold increase in elongation at break as compared to blend 90:10-0, leading to a 28-fold increase in toughness (determined by calculating the area under the stress-strain curve). Blend 90:10-2.5 performed even better, with a relative increase in ultimate stress of 2.1-fold, a 14.8-fold increase in elongation at break, and a 53-fold improvement in toughness. Blend 90:10-5 showed diminishing returns with the additional compatibilizer as compared to the large improvements seen in 90:10-1 and 90:10-2.5 but retained excellent toughness. Here, ultimate stress improvement was near the gain seen for blend 90:10-2.5; however, elongation at break improved 17.5 times over the uncompatibilized sample allowing for the largest increase in toughness for the 90:10 series (61-fold) compared to the uncompatibilized blend. This effect of diminishing returns in mechanical performance with increasing amounts of compatibilizer seen in the 90:10-5 sample was expected, as high levels of compatibilizer can act as a third component in the blend rather than as an interfacial adhesive.18-19

Figure 16:
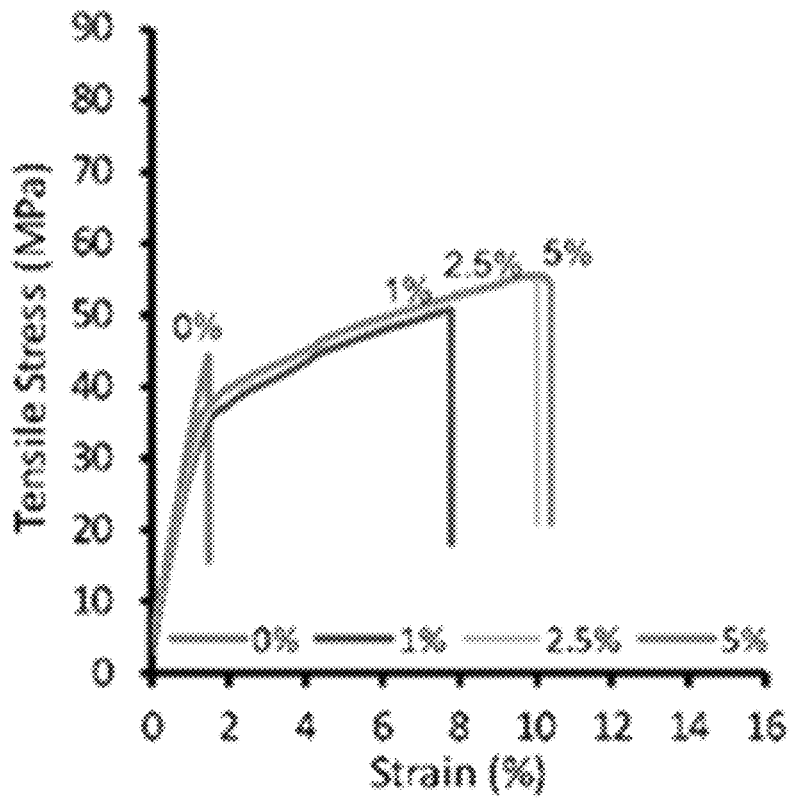
FIG. 16 shows a graph that can demonstrate tensile tests (strain vs. stress) for Hi-C films with variable wt % compatibilizer. Tensile testing was performed on dog bones in accordance with ASTM D638 at a rate of 5 mm/min. 80:20 Hi-C series. 80:20-0; 80:20-1; 80:20-2.5; 80:20-5. Traces are representative of five runs per sample.

The 80:20 Hi-C series showed a similar trend, but the ultimate stresses and moduli for these blends were predictably lower than for the 90:10 series due to the higher wt % of the soft PB component (FIG. 16 and Table 6). As with the 90:10 series, diminishing returns were also observed for addition of more compatibilizer to the 80:20 series above 2.5 wt %. However, large increases in elongation at break and toughness were also observed upon addition of CTA-b-PB-b-CTA compatibilizer for these higher PB blends.

Figure 17:
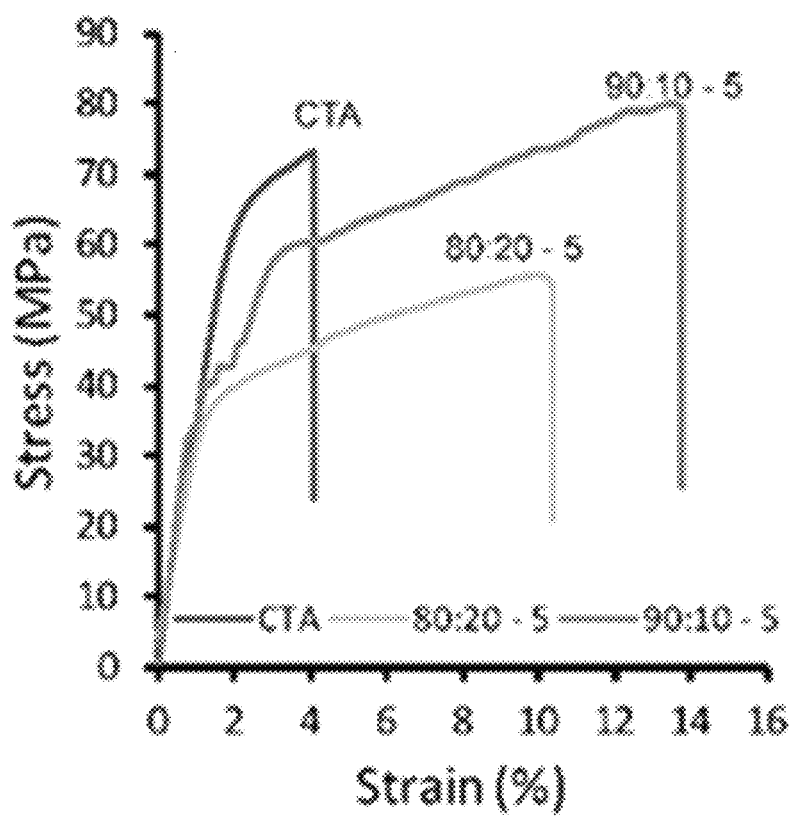
FIG. 17 shows a graph that can demonstrate tensile tests (strain vs. stress) for Hi-C films with variable wt % compatibilizer. Tensile testing was performed on dog bones in accordance with ASTM D638 at a rate of 5 mm/min. Tensile tests of Hi-C blends compared with pure CTA. CTA; 80:20-5; 90:10-5. Traces are representative of five runs per sample.
Figure 18:
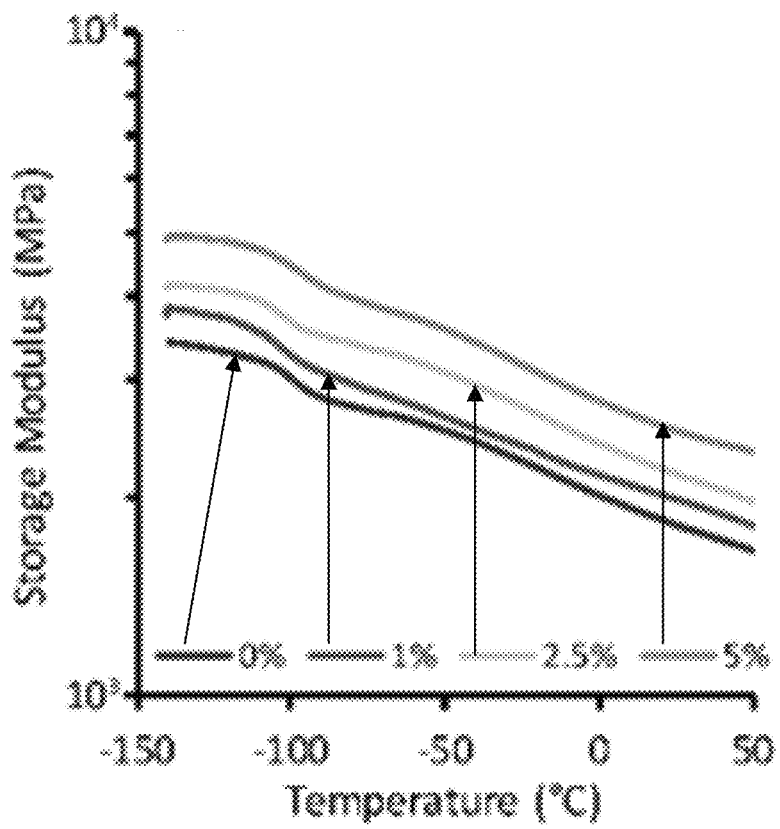
FIG. 18 shows a graph that can demonstrate thermomechanical analysis of Hi-C blends carried out in tension mode at a frequency of 1 Hz and a heating rate of 3° C./min. Storage modulus vs. temperature traces for 90:10 Hi-C series: 90:10-0; 90:10-1; 90:10-2.5; 90:10-5.
Figure 19:
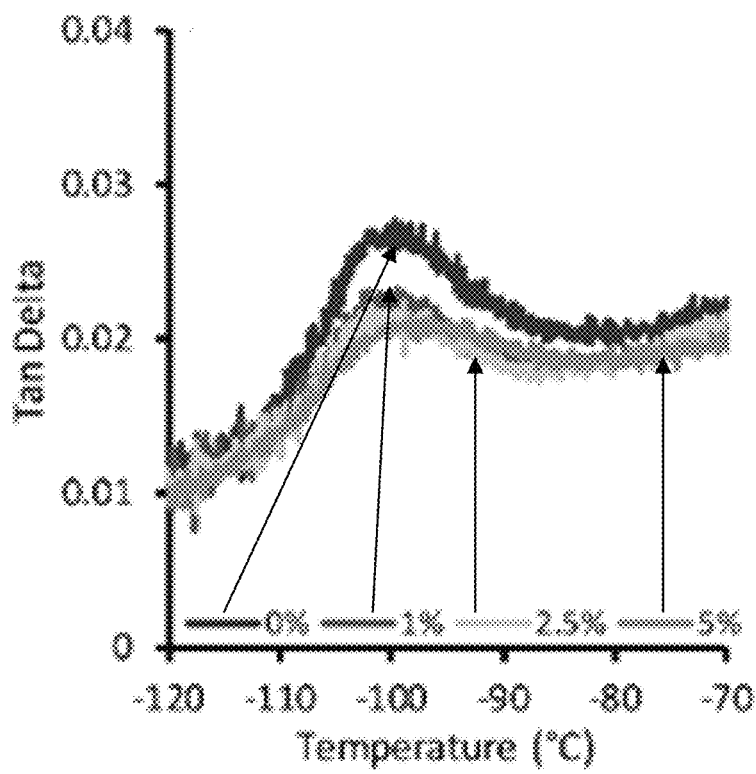
FIG. 19 shows a graph that can demonstrate thermomechanical analysis of Hi-C blends carried out in tension mode at a frequency of 1 Hz and a heating rate of 3° C./min. Tan delta vs. temperature traces for 90:10 Hi-C series: 90:10-0; 90:10-1; 90:10-2.5; 90:10-5.
Figure 20A:
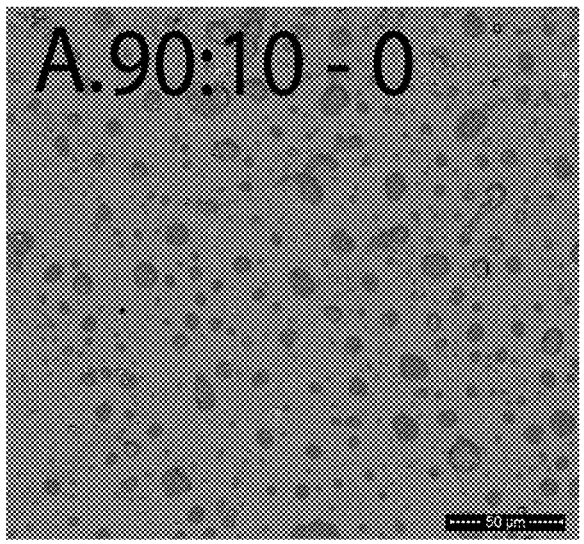
FIGS. 20A-20D shows backscattered electron SEM images of Hi-C blends at 1000× magnification.
Figure 20B:
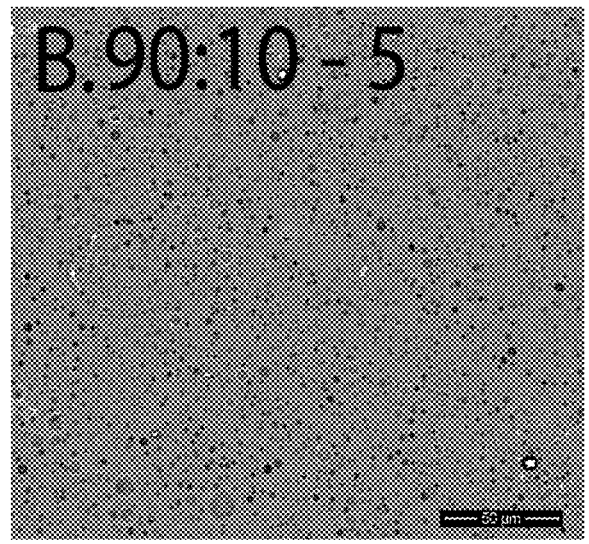
Figure 20C:
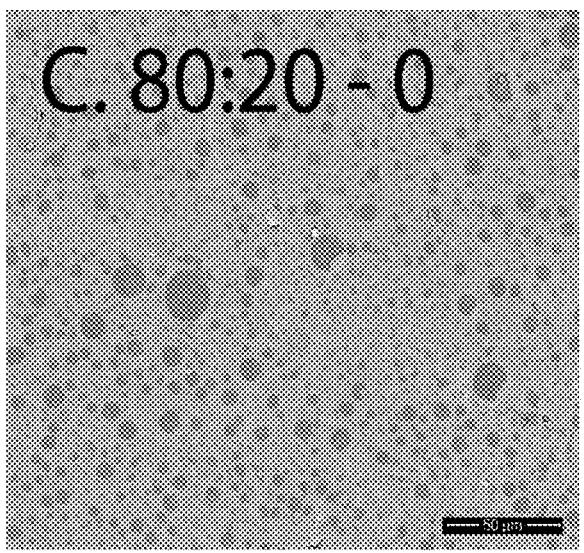
Figure 20D:
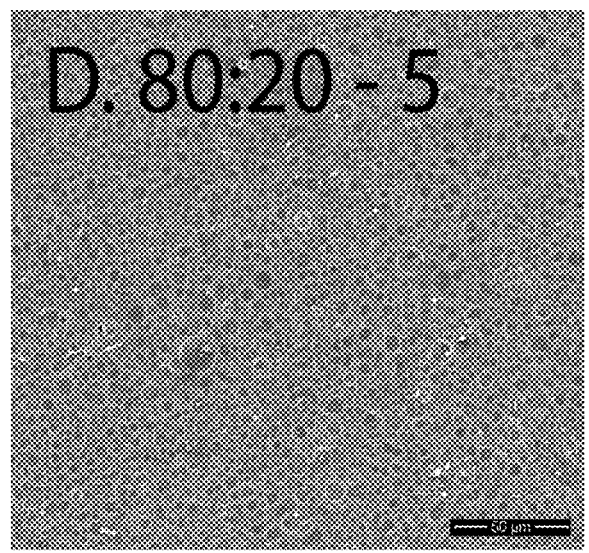

Hi-C blends 90:10-5 and 80:20-5 were compared to pure CTA (FIG. 17 and Table 6). While the ultimate tensile strengths of pure CTA and blend 90:10-5 were similar at a strain rate of 5 mm/min, the Hi-C blend showed a 4-fold increase in toughness due to the large improvement in elongation at break. The 80:20-5 blend showed a 2-fold increase in toughness compared with pure CTA. At higher strain rates (20 mm/min), the 90:10-5 blend showed a 2.2-fold increase in toughness to 360 MPa over pure CTA, while the 80:20-5 blend increased by 2.4 fold to 380 MPa (FIGS. 33A-33B. These observations are consistent with tensile studies on HIPS blends, which showed that blended materials with more elastic polymer component elongated farther at faster strain rates compared to blends with less elastic material.[20,29]

TABLE 6

Thermochemical Properties

| Polyme or Polymer Blend (CTA:PB-Compatibilizer) | Ultimate Tensile Strength (MPa)$^c$ | Elongation at Break (%)$^c$ | Modulus (MPa)$^{a,c}$ | Modulus at 25° C. (MPa)$^b$ | Toughness (MPa)$^c$ |
|---|---|---|---|---|---|
| CTA | 78 ± 3 | 3 ± 1 | 3670 ± 50 | 3450 | 210 ± 7$^d$, 160 ± 8$^e$ |
| 90:10-0 | 39 ± 2 | 0.8 ± 0.3 | 1550 ± 90 | 1816 | 14 ± 6$^d$, 32 ± 9$^e$ |
| 90:10-1 | 71 ± 5 | 8 ± 2 | 1800 ± 80 | 1910 | 390 ± 10$^d$, 260 ± 12$^e$ |
| 90:10-2.5 | 82 ± 2 | 11.8 ± 0.9 | 2130 ± 70 | 2160 | 750 ± 10$^d$, 300 ± 14$^e$ |
| 90:10-5 | 81 ± 6 | 14 ± 1 | 2260 ± 50 | 2490 | 860 ± 20$^d$, 360 ± 17$^e$ |
| 80:20-0 | 46 ± 5 | 2.1 ± 0.3 | 1400 ± 100 | 1430 | 36 ± 2$^d$, 57 ± 9$^e$ |
| 80:20-1 | 50 ± 1 | 8.4 ± 0.6 | 1570 ± 70 | 1610 | 310 ± 10$^d$, 280 ± 16$^e$ |
| 80:20-2.5 | 55 ± 3 | 10 ± 1 | 1790 ± 70 | 1740 | 440 ± 10$^d$, 330 ± 20$^e$ |
| 80:20-5 | 57 ± 2 | 11.1 ± 0.6 | 1810 ± 60 | 1750 | 470 ± 10$^d$, 380 ± 18$^e$ |

$^a$Determined by tensile testing at 5 mm/min based on the initial slope.
$^b$Determined by DMA at 25° C. at a frequency of 1 Hz.
$^c$Error bars indicate standard deviation for five runs per sample.
$^d$Tensile rate 5 mm/min.
$^e$Tensile rate 20 mm/min.

Figure 5:
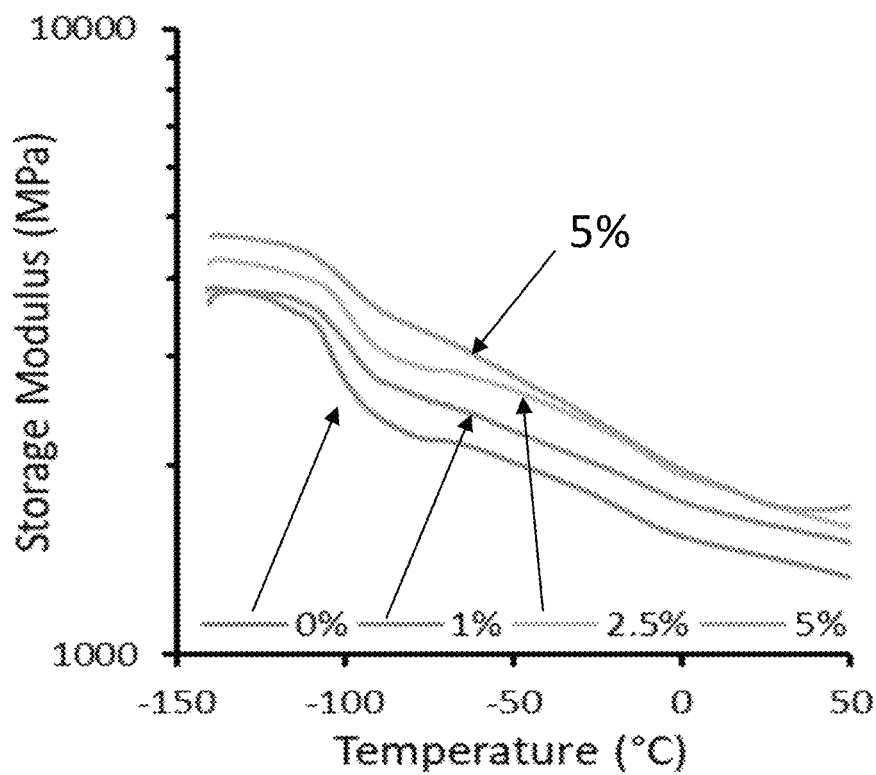
FIG. 5 shows a graph that can demonstrate thermomechanical analysis results from PB and CTA blends made with a variable weight percent (wt. %) of ABA triblock copolymer compatibilizer. Analysis was carried out in tension mode at a frequency of about 1 Hz and a heating rate of about 3° C. per minute. DMA (dynamic mechanical analysis traces of each blend show an increase in modulus as more compatibilizer is added to the blend. Storage modulus vs. temperature traces for 80:20 Hi-C series: 80:20-0; 80:20-1; 80:20-2.5; 80:20-5.
Figure 6:
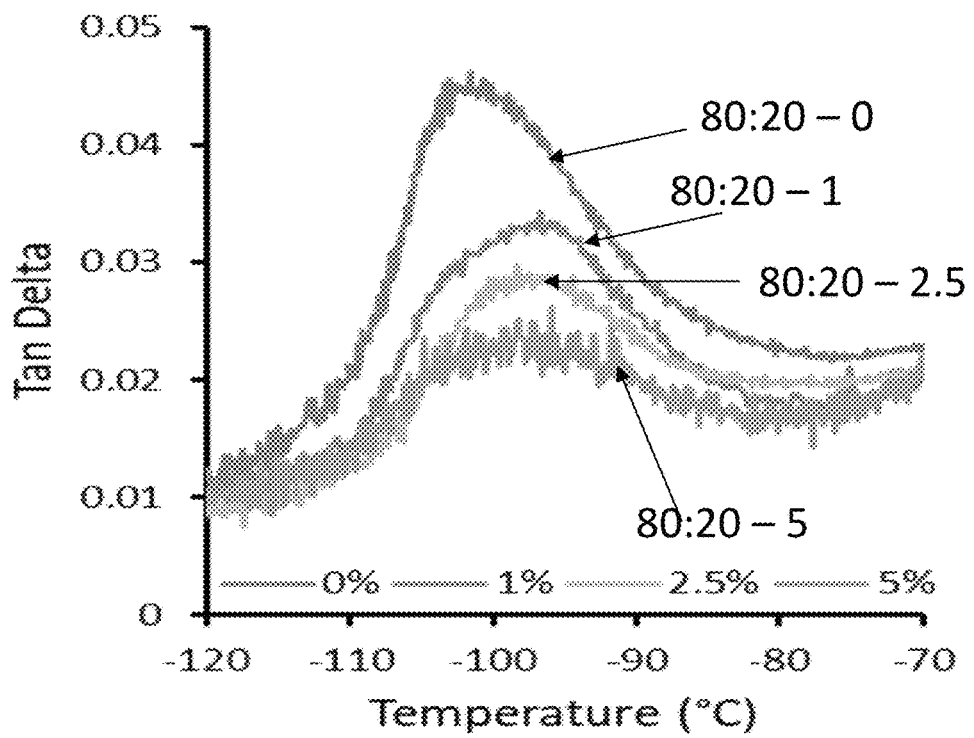
FIG. 6 shows a graph that can demonstrate thermomechanical analysis of PB and CTA blends made with a variable weight percent (wt. %) of ABA triblock copolymer compatibilizer. Analysis was carried out in tension mode at a frequency of about 1 Hz and a heating rate of about 3° C. per minute. Tan delta curve with peak maxima at −100° C. corresponds to the onset of the rubbery plateau for PB. Tan delta vs. temperature traces for 80:20 Hi-C series: 80:20-0; 80:20-1; 80:20-2.5; 80:20-5.
Figure 7:
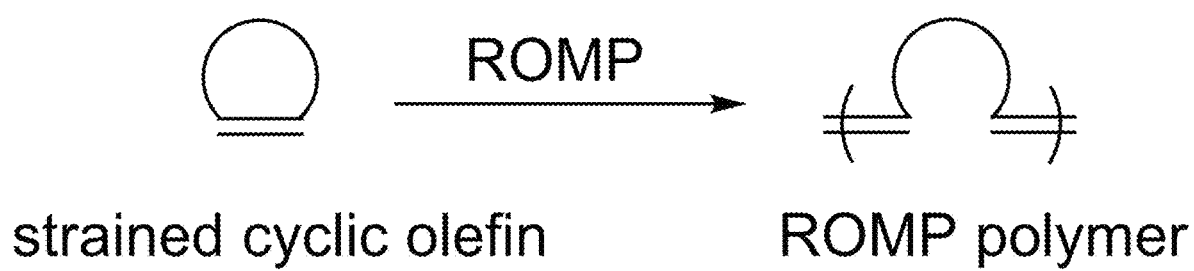
FIG. 7 shows a schematic of a generic ring-opening metathesis polymerization (ROMP).
Figure 31:
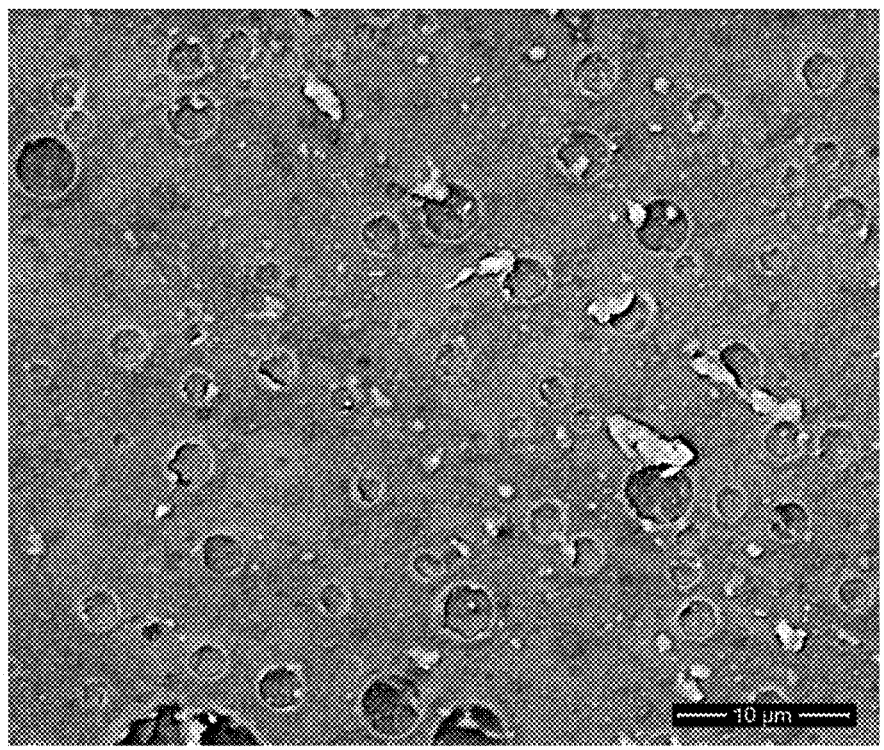
FIG. 31 shows SEM image at 5000× magnification of 90:10-5. Dark circles and craters are PB in a matrix of light colored CTA.
Figure 32:
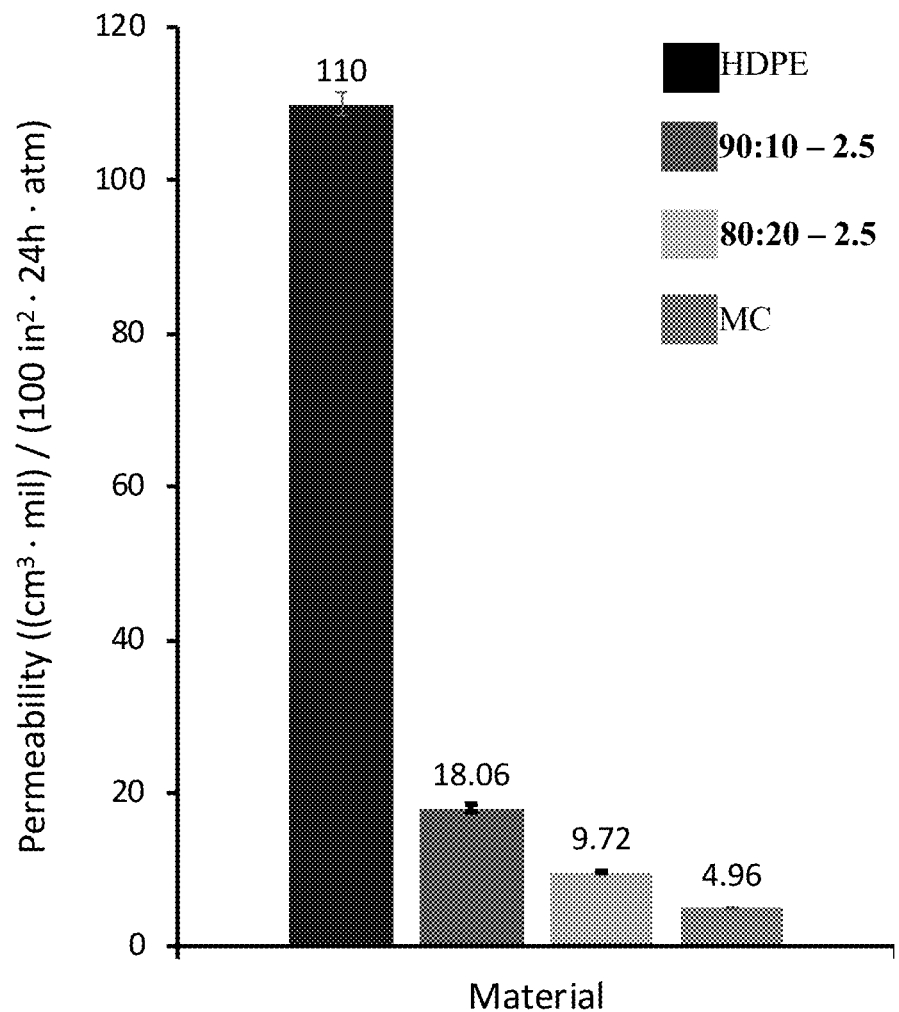
FIG. 32 Xtra 6 a graph that can demonstrate Oxygen permeability performed on HDPE, 90:10-2.5, 80:20-2.5, and MC at 23° C. and 0% relative humidity with an oxygen flow of 20 CC/min and a nitrogen flow of 10 CC/min. Each sample was ran three times.

Thermomechanical studies of the Hi-C blends were performed by dynamic mechanical analysis (DMA) from −150 to 50° C. at 3° C./min (FIGS. 5-6 and 31-32). This method was used to probe the elastic modulus and damping of the blends as a function of temperature. Below −100° C., all the blends behaved as hard glasses. The Hi-C blends became softer upon heating above −100° C. as the temperature crossed the glass transition temperature ($T_g$) of PB. The 90:10 Hi-C series demonstrated an increase in storage modulus with increasing compatibilizer content (Table 6 and FIG. 31). Examining the tan delta of the series through the $T_g$ of the PB phase showed that added compatibilizer reduced the magnitude of the tan delta peak (FIG. 32). Reduction of this peak indicates improved adhesion between the immiscible phases due to the triblock copolymer decreasing interfacial tension between the CTA and PB domains. This influence was also seen in the temperature vs. storage modulus traces (FIG. 31). More compatibilizer caused a decrease in the magnitude of the modulus drop through the $T_g$ of PB. This effect was more pronounced in the 80:20 Hi-C series (FIGS. 5-6). For the 80:20-0 sample, a large drop in modulus was observed at −100° C., but when compatibilizer was added to the blend, the sample remained stiffer as temperature increased (FIG. 5).

Blend morphology was investigated by scanning electron microscopy (SEM). The surfaces of the native films were imaged using the backscattering scanning electron imaging mode, revealing dark PB droplets in a light CTA matrix (FIGS. 33A-33D). This contrast is due the lower electron density of the PB globular domains compared to the relatively electron rich CTA matrix. Through image analysis, we determined that as more compatibilizer was added to the blends, the average droplet size decreased (Table 7).

TABLE 7

| Material | Droplet diameter (μm) |
|---|---|
| 80:20-0 | 6 ± 3 |
| 80:20-1 | 4 ± 2 |
| 80:20-2.5 | 3 ± 1 |
| 80:20-5 | 2 ± 1 |
| 90:10-0 | 5 ± 2 |
| 90:10-1 | 3 ± 1 |
| 90:10-2.5 | 2.0 ± 0.9 |
| 90:10-5 | 1.6 ± 0.6 |

Figure 33A:
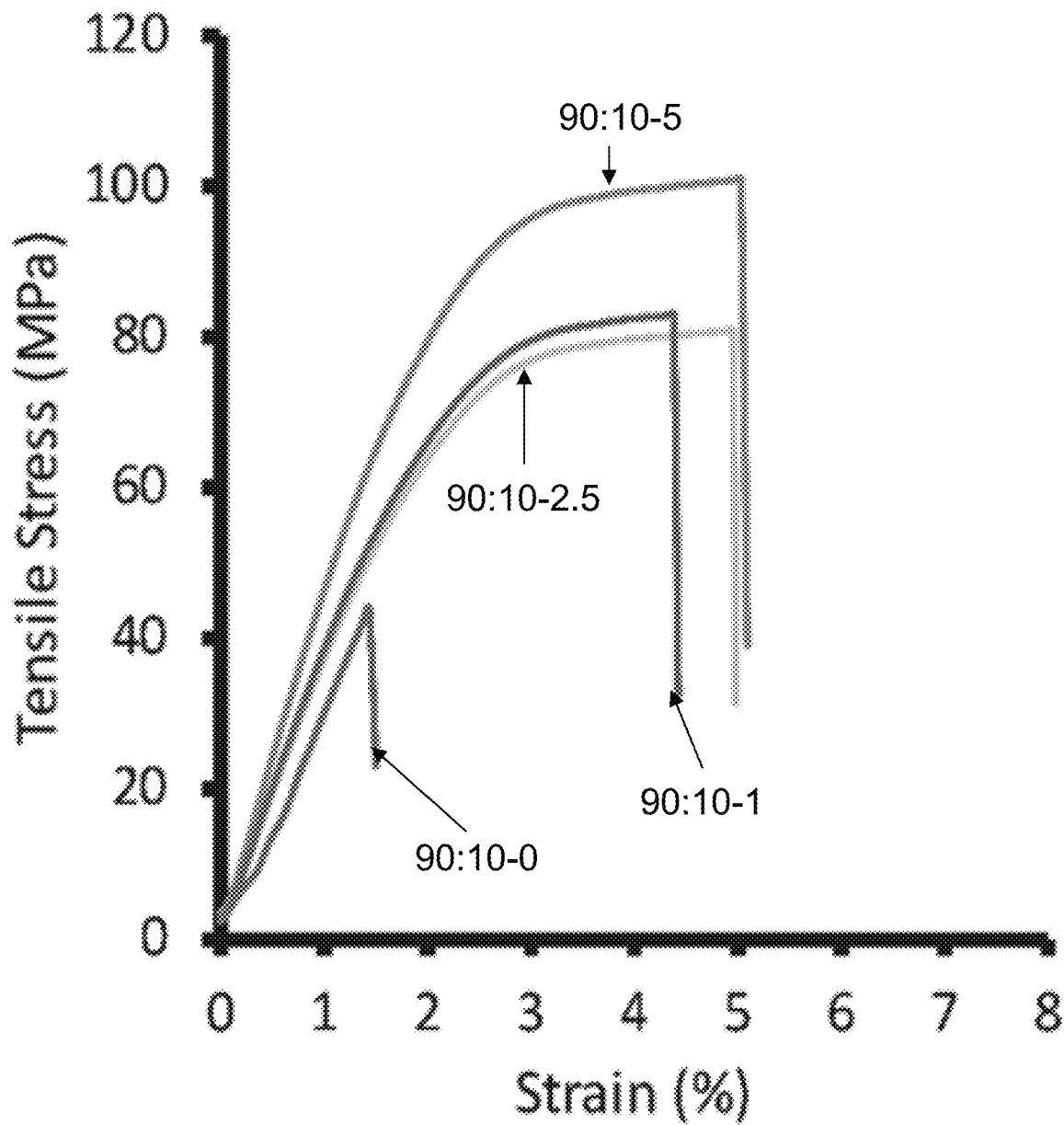
FIGS. 33A-33B show graphs that can demonstrate results from tensile tests (strain vs. stress) for Hi-C films with variable wt % of compatibilizer. Tensile testing was performed on dog bones in accordance with ASTM D638 at a rate of 20 mm/min.
Figure 33B:
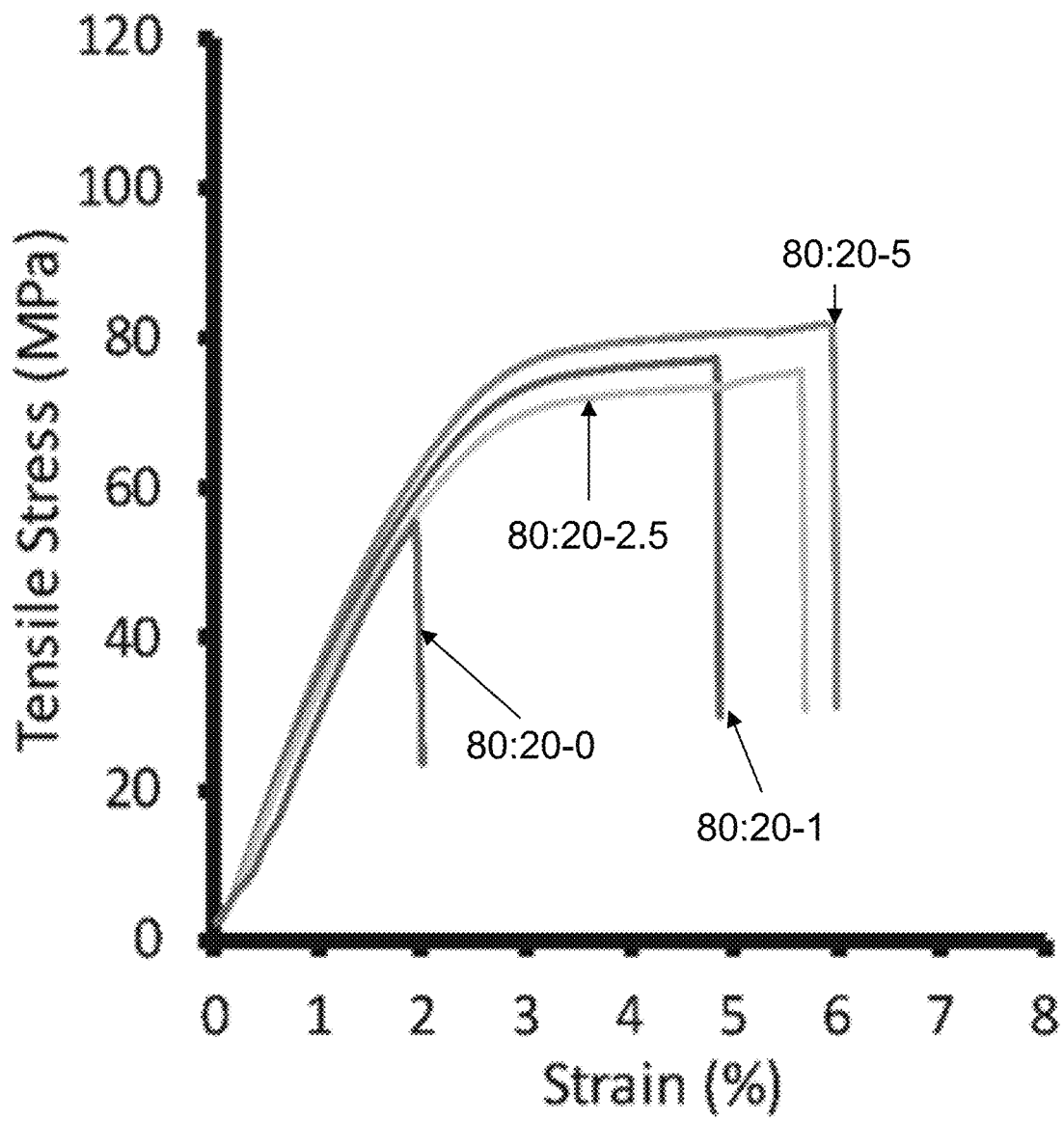

This is typical of polymer blends of increasing miscibility and highlights the ability of the compatibilizer to bridge phase boundaries. SEM images of the 90:10 series showed this trend, with domain diameters of 5±2 μm for the 90:10-0 sample dropping to 1.6±0.6 μm for the 90:10-5 sample (FIGS. 33A and 33B). SEM images of Hi-C blends for the 80:20 series showed the same trend, with droplet diameters dropping from 6±3 μm for the 80:20-0 sample to 2±1 μm for the 80:20-5 sample (FIGS. 33C and 33D). Additional SEM images are shown in (FIGS. 24-31).

After investigating the thermomechanical properties of the blends, 6-inch diameter pinhole-free films of HDPE, 90:10-2.5, 80:20-2.5, and MC were prepared for oxygen permeability studies. First, HDPE and MC homopolymer films were tested. MC shows two orders of magnitude lower oxygen permeability compared to HDPE (FIG. 33). Blend samples compatibilized with 2.5 wt % compatibilizer were then tested for their oxygen permeability. These samples were chosen for their higher toughness and easier melt press-ability. The addition of 10 wt % MC to make the 90:10-2.5 film shows a six-fold decrease or an order of magnitude drop in oxygen permeability as compared to HDPE. As the wt % of MC increase to make the 80:20-2.5 film (FIG. 23), the oxygen permeability drops by an additional order of magnitude or an 11-fold decrease compared to HDPE. Sample films of uncompatibilized blends were attempted to see how compatibilization affect the permeability; however, pinhole-free samples were not attainable after many undertakings.

Summary

This Example can demonstrate a simple, robust synthesis of CTA-b-PB-b-CTA, an ABA triblock copolymer that represents to our knowledge the first polysaccharide-based triblock copolymer. Use of this ABA triblock copolymer at levels as low as 1 wt. % in mixtures of CTA and PB produced compatibilized blends that showed a remarkable increase in toughness and stiffness compared with uncompatibilized blends. Moreover, these Hi-C blends had substantially increased toughness compared to CTA while maintaining similar tensile strengths and moduli. These increases in mechanical and thermomechanical properties are attributed to the ABA triblock copolymer acting as an interfacial adhesive between the two polymer phases, causing the domains of the PB phases to shrink with the addition of compatibilizer. Additionally, the compatibilizer appears to decrease chain mobility at the interfaces, enabling efficient transfer of stress between the domains. These materials highlight the property enhancements that can be achieved for blends of cellulose-derived polymers when produced using appropriate compatibilizers. This strategy can increase the application space for polysaccharide-based materials, reducing the reliance on petroleum-derived polymers.

Abbreviations for Example 6

COD, cyclooctadiene; CTA, cellulose triacetate; DMA, dynamic mechanical analysis; HG2, Hoveyda-Grubbs $2^{nd}$ generation catalyst; PB, polybutadiene; ROMP, ring-opening metathesis; SEC, size exclusion chromatography.

REFERENCES FOR EXAMPLE 6

1. Lebreton, L.; Slat, B.; Ferrari, F.; Sainte-Rose, B.; Aitken, J.; Marthouse, R.; Hajbane, S.; Cunsolo, S.; Schwarz, A.; Levivier, A.; Noble, K.; Debeljak, P.; Maral, H.; Schoeneich-Argent, R.; Brambini, R.; Reisser, J., Evidence that the Great Pacific Garbage Patch is rapidly accumulating plastic. Sci. Rep. 2018, 8 (1), 4666.
2. Cressey, D., The plastic ocean. Nature 2016, 536 (7616), 263-265.
3. Lebreton, L. C.; Van der Zwet, J.; Damsteeg, J.-W.; Slat, B.; Andrady, A.; Reisser, J., River plastic emissions to the world's oceans. Nat. Commun. 2017, 8, 15611.
4. Schneiderman, D. K.; Hillmyer, M. A., 50th anniversary perspective: There is a great future in sustainable polymers. Macromolecules 2017, 50 (10), 3733-3749.
5. Klemm, D.; Heublein, B.; Fink, H. P.; Bohn, A., Cellulose: fascinating biopolymer and sustainable raw material. Angewandte Chemie International Edition 2005, 44 (22), 3358-3393.
6. Geyer, R.; Jambeck, J. R.; Law, K. L., Production, use, and fate of all plastics ever made. Sci. Adv. 2017, 3 (7), e1700782.
7. Glasser, W. G. In 6. *Prospects for future applications of cellulose acetate*, Macromolecular Symposia, Wiley Online Library: 2004; pp 371-394.
8. Fox, S. C.; Li, B.; Xu, D.; Edgar, K. J., Regioselective esterification and etherification of cellulose: a review. Biomacromolecules 2011, 12 (6), 1956-1972.
9. Schatz, C.; Lecommandoux, S., Polysaccharide-Containing Block Copolymers: Synthesis, Properties and Applications of an Emerging Family of Glycoconjugates. Macromol. Rapid Commun. 2010, 31 (19), 1664-1684.
10. Park, H.-M.; Misra, M.; Drzal, L. T.; Mohanty, A. K., "Green" nanocomposites from cellulose acetate bioplastic and clay: effect of eco-friendly triethyl citrate plasticizer. Biomacromolecules 2004, 5 (6), 2281-2288.
11. Avérous, L.; Fringant, C.; Moro, L., Plasticized starch-cellulose interactions in polysaccharide composites. Polymer 2001, 42 (15), 6565-6572.
12. Dave, V.; Tamagno, M.; Focher, B.; Marsano, E., Hyaluronic acid-(hydroxypropyl) cellulose blends: A solution and solid state study. Macromolecules 1995, 28 (10), 3531-3539.
13. Wu, Y.-B.; Yu, S.-H.; Mi, F.-L.; Wu, C.-W.; Shyu, S.-S.; Peng, C.-K.; Chao, A.-C., Preparation and characterization on mechanical and antibacterial properties of chitsoan/cellulose blends. Carbohyd. Polym. 2004, 57 (4), 435-440.
14. Khalf, A.; Nashar, D. E.; Maziad, N., Effect of grafting cellulose acetate and methylmethacrylate as compatibilizer onto NBR/SBR blends. *Materials & Design (1980-2015)* 2010, 31 (5), 2592-2598.
15. Kim, M., Evaluation of degradability of hydroxypropylated potato starch/polyethylene blend films. *Carbohyd. Polym.* 2003, 54 (2), 173-181.
16. Lomakin, S.; Rogovina, S.; Grachev, A.; Prut, E.; Alexanyan, C. V., Thermal degradation of biodegradable blends of polyethylene with cellulose and ethylcellulose. *Thermochimica acta* 2011, 521 (1-2), 66-73.
17. Hong, P.; Boerio, F.; Smith, S., Surface segregation in blends of polystyrene and deuterated polystyrene. *Macromolecules* 1993, 26 (6), 1460-1464.
18. Di Lorenzo, M.; Frigione, M., Compatibilization criteria and procedures for binary blends: A review. *Journal of polymer engineering* 1997, 17 (6), 429-460.
19. Koning, C.; Van Duin, M.; Pagnoulle, C.; Jerome, R., Strategies for compatibilization of polymer blends. *Prog. Polym. Sci.* 1998, 23 (4), 707-757.
20. Hobbs, S., The effect of rubber particle size on the impact properties of high impact polystyrene (HIPS) blends. *Polymer Engineering & Science* 1986, 26 (1), 74-81.
21. Edgar, K. J.; Buchanan, C. M.; Debenham, J. S.; Rundquist, P. A.; Seiler, B. D.; Shelton, M. C.; Tindall, D., Advances in cellulose ester performance and application. *Progress in Polymer Science* 2001, 26 (9), 1605-1688.
22. Yamaguchi, M.; Manaf, M. E. A.; Songsurang, K.; Nobukawa, S., Material design of retardation films with extraordinary wavelength dispersion of orientation birefringence: a review. *Cellulose* 2012, 19 (3), 601-613.
23. De Oliveira, W.; Glasser, W. G., Novel cellulose derivatives. II. synthesis and characteristics of mono-functional cellulose propionate segments. *Cellulose* 1994, 1 (1), 77-86.
24. Kamitakahara, H.; Suhara, R.; Yamagami, M.; Kawano, H.; Okanishi, R.; Asahi, T.; Takano, T., A versatile pathway to end-functionalized cellulose ethers for click chemistry applications. *Carbohydrate polymers* 2016, 151, 88-95.
25. Kamitakahara, H.; Enomoto, Y.; Hasegawa, C.; Nakatsubo, F., Synthesis of diblock copolymers with cellulose derivatives. 2. Characterization and thermal properties of cellulose triacetate-block-oligoamide-15. *Cellulose* 2005, 12 (5), 527-541.
26. Ji, S.; Hoye, T. R.; Macosko, C. W., Controlled synthesis of high molecular weight telechelic polybutadienes by ring-opening metathesis polymerization. *Macromolecules* 2004, 37 (15), 5485-5489.
27. Arrington, K. J.; Waugh, J. B.; Radzinski, S. C.; Matson, J. B., Photo- and Biodegradable Thermoplastic Elastomers: Combining Ketone-Containing Polybutadiene with Polylactide Using Ring-Opening Polymerization and Ring-Opening Metathesis Polymerization. *Macromolecules* 2017.
28. Odian, G., *Principles of polymerization*. Wiley-Interscience New York: 2004; Vol. 3.
29. Silberberg, J.; Han, C., The effect of rubber particle size on the mechanical properties of high-impact polystyrene. *Journal of Applied Polymer Science* 1978, 22 (3), 599-609.

We claim:
1. An ABA triblock copolymer comprising:
a polysaccharide, wherein the polysaccharide is the A block polymer; and
a polyolefin, wherein the polyolefin is the B block polymer.
2. The ABA triblock copolymer of claim 1, wherein the B block polymer is a polybutadiene, polyethylene, polyisoprene, polychloroprene, poly(cyclooctene), poly(cylcopentene), and poly(norbornene).
3. The ABA triblock copolymer of claim 1, wherein the polysaccharide is cellulose or a cellulose derivative.
4. The ABA triblock copolymer of claim 3, wherein the polysaccharide is cellulose triacetate.
5. The ABA triblock copolymer of claim 3, wherein the polysaccharide is methyl cellulose.
6. The ABA triblock copolymer of claim 4, wherein the B block polymer is a polybutadiene.
7. The ABA triblock copolymer of claim 6, wherein the polybutadiene is modified with a photodegradable polyketone.
8. The ABA triblock copolymer of claim 1, wherein the B block polymer is a polyethylene.
9. The ABA triblock copolymer of claim 8, wherein the polyethylene is a high density polyethylene.
10. A polymer blend comprising:
a compatibilizer, wherein the compatibilizer is an ABA triblock copolymer,
wherein the ABA triblock copolymer comprises a polysaccharide, wherein the polysaccharide is the A block polymer; and a polyolefin, wherein the polyolefin is the B block polymer.
11. The polymer blend of claim 10, wherein the compatibilizer is present at a wt. % ranging from about 0.5 wt. % to about 10 wt. %.
12. The polymer blend of claim 10, wherein the compatibilizer is present at a wt. % ranging from about 0.5 wt. % to about 5 wt. %.
13. The polymer blend of claim 10, wherein the compatibilizer is present at a wt. % ranging from about 0.5 wt. % to about 2.5 wt. %.
14. The polymer blend of claim 10, wherein the compatibilizer is present at a wt. % ranging from about 0.5 wt. % to about 1 wt. %.
15. The polymer blend of claim 10, wherein the B block polymer is a polyethylene.
16. The polymer blend of claim 15, wherein the polyethylene is high density polyethylene.
17. The polymer blend of claim 10, wherein the compatibilizer is an ABA triblock copolymer and wherein the B block polymer is a polybutadiene.
18. The polymer blend of claim 17, wherein the polysaccharide is cellulose or a cellulose derivative.
19. The polymer blend of claim 18, wherein the polysaccharide is cellulose triacetate or methyl cellulose.
20. A method of making a polymer blend, the method comprising:
compatibilizing a polysaccharide and a polyolefin with an ABA triblock,
wherein the ABA triblock copolymer comprises a polysaccharide, wherein the polysaccharide is the A block polymer; and a polyolefin, wherein the polyolefin is the B block polymer.

* * * * *